US012750608B2

(12) United States Patent
Kuroda

(10) Patent No.: US 12,750,608 B2
(45) **Date of Patent: *Sep. 29, 2026**

(54) SEMICONDUCTOR DEVICE HAVING UNITS THAT OUTPUT PREDETERMINED SIGNAL VALUES IN DEFINED POSITIONS RELATIVE TO UNITS THAT OUTPUT SIGNALS IN RESPONSE TO PIXEL OUTPUTS

(71) Applicant: Canon Kabushiki Kaisha, Tokyo (JP)

(72) Inventor: Yukihiro Kuroda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 18/826,295

(22) Filed: Sep. 6, 2024

(65) Prior Publication Data

US 2024/0430588 A1 Dec. 26, 2024

Related U.S. Application Data

(63) Continuation of application No. 17/508,049, filed on Oct. 22, 2021, now Pat. No. 12,114,085.

(30) Foreign Application Priority Data

Oct. 23, 2020 (JP) ................................ 2020-177921

(51) Int. Cl.
*H04N 25/78* (2023.01)
*B60R 11/04* (2006.01)
(Continued)

(52) U.S. Cl.
CPC ............. *H04N 25/78* (2023.01); *B60R 11/04* (2013.01); *H04N 25/69* (2023.01); *H04N 25/773* (2023.01); *B60R 2300/10* (2013.01)

(58) Field of Classification Search
CPC ...... H04N 25/78; H04N 25/69; H04N 25/773; H04N 25/60; H04N 25/68; H04N 25/75
See application file for complete search history.

(56) References Cited

U.S. PATENT DOCUMENTS 12,114,085 B2 * 10/2024 Kuroda .................. H04N 25/69
12,244,951 B2 * 3/2025 Kitano ................... H04N 25/79
(Continued)

FOREIGN PATENT DOCUMENTS

JP 2015165544 A 9/2015
JP 2019009768 A 1/2019
(Continued)

OTHER PUBLICATIONS

Japanese Office Action dated May 21, 2024 in counterpart Japanese Patent Appln. No. 2020-177921.

*Primary Examiner* — Nicholas G Giles
(74) *Attorney, Agent, or Firm* — Venable LLP

(57) ABSTRACT

Provided is a semiconductor device including: first signal generation units arranged so as to form rows and columns and corresponding to pixels configured to output a signal in response to incidence of light, each of the first signal generation units being configured to output a first digital signal in response to an output from a corresponding pixel; second signal generation units arranged corresponding to at least a part of the rows and the columns, each of the second signal generation units being configured to output a second digital signal having a predetermined digital value; and a readout unit configured to output a signal based on at least one of the first digital signal and the second digital signal that is output from a selected part of the first signal generation units and the second signal generation units.

21 Claims, 17 Drawing Sheets

(51) Int. Cl.
*H04N 25/69* (2023.01)
*H04N 25/773* (2023.01)

(56) References Cited

U.S. PATENT DOCUMENTS

| | | | | |
|---|---|---|---|---|
| 2020/0296307 | A1 | 9/2020 | Ogawa | |
| 2021/0044768 | A1 | 2/2021 | Kuroda | |
| 2023/0247323 | A1 * | 8/2023 | Kitano | H04N 25/47 348/295 |

FOREIGN PATENT DOCUMENTS

| | | | |
|---|---|---|---|
| JP | 2019029694 | A | 2/2019 |
| JP | 2019186598 | A | 10/2019 |
| JP | 2020010093 | A | 1/2020 |
| JP | 2020096347 | A | 6/2020 |
| WO | 2020095540 | A1 | 5/2020 |

* cited by examiner

SEMICONDUCTOR DEVICE HAVING UNITS THAT OUTPUT PREDETERMINED SIGNAL VALUES IN DEFINED POSITIONS RELATIVE TO UNITS THAT OUTPUT SIGNALS IN RESPONSE TO PIXEL OUTPUTS

CROSS-REFERENCE TO RELATED APPLICATION

This application is a Continuation of U.S. patent application Ser. No. 17/508,049, filed Oct. 22, 2021, which is hereby incorporated herein by reference.

BACKGROUND OF THE INVENTION

Field of the Invention

The present disclosure relates to a semiconductor device.

Description of the Related Art

A semiconductor device such as an avalanche photodiode that outputs a digital signal corresponding to a count value of photons incident on a photoelectric conversion element is known. Japanese Patent Application Laid-Open No. 2019-9768 discloses a semiconductor device in which a plurality of pixels each including an avalanche photodiode are arranged to output a digital signal corresponding to a light reception frequency of photons.

Japanese Patent Application Laid-Open No. 2019-9768 does not investigate outputting a digital signal including information other than information based on incident light from a semiconductor device.

SUMMARY OF THE INVENTION

An object of the present disclosure is to provide a semiconductor device capable of outputting a digital signal including information other than information based on incident light.

According to an aspect of the present disclosure, there is provided a semiconductor device including: a plurality of first signal generation units arranged so as to form a plurality of rows and a plurality of columns and corresponding to a plurality of pixels configured to output a signal in response to incidence of light, each of the plurality of first signal generation units being configured to output a first digital signal in response to an output from a corresponding pixel; a plurality of second signal generation units arranged corresponding to at least a part of the plurality of rows and the plurality of columns, each of the plurality of second signal generation units being configured to output a second digital signal having a predetermined digital value; and a readout unit configured to output a signal based on at least one of the first digital signal and the second digital signal that is output from a selected part of the plurality of first signal generation units and the plurality of second signal generation units.

Further features of the present invention will become apparent from the following description of exemplary embodiments with reference to the attached drawings.

DESCRIPTION OF THE EMBODIMENTS

Figure 1:
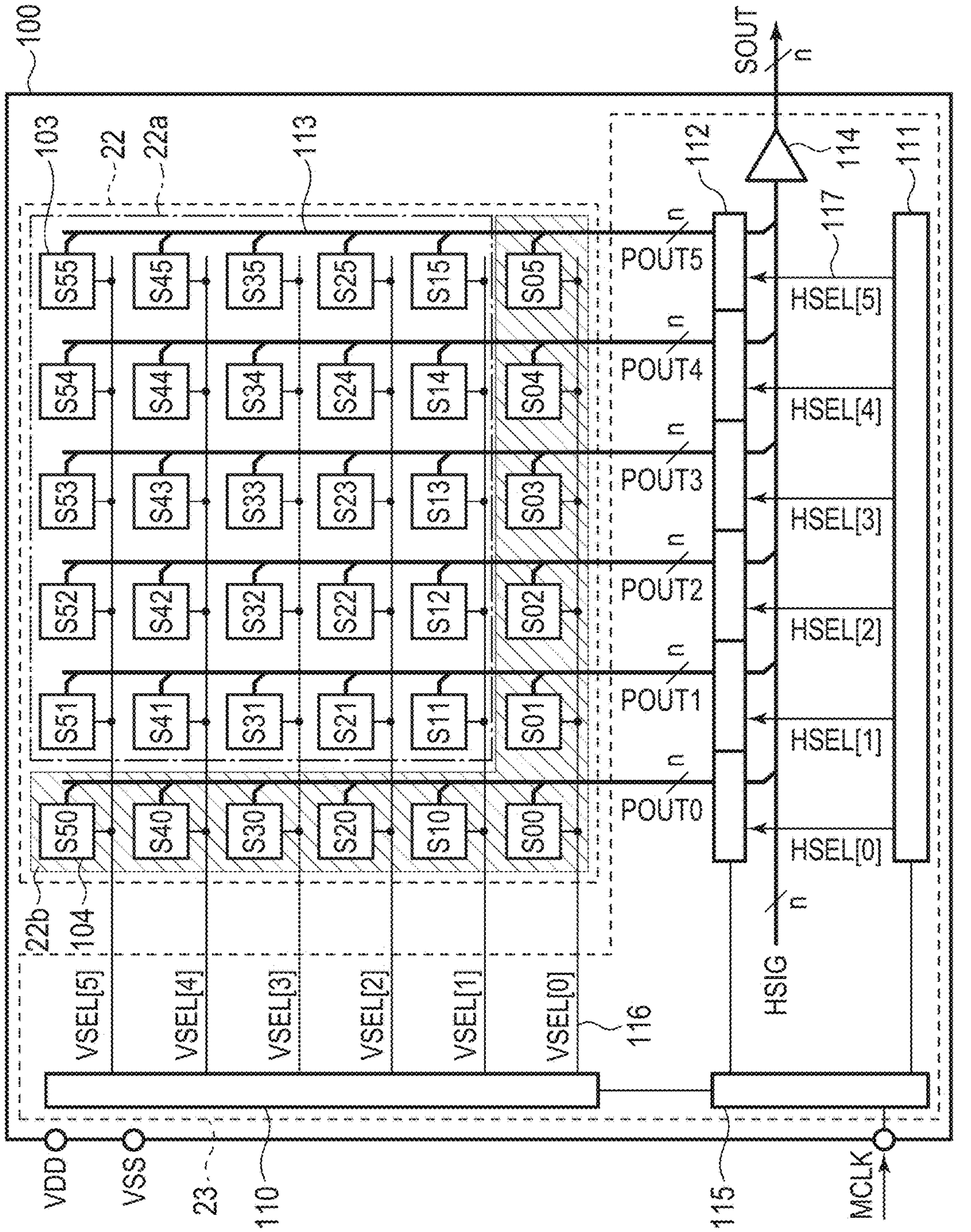
FIG. 1 is an example of a block diagram of a semiconductor device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

First Embodiment

FIG. 1 is an example of a block diagram of a semiconductor device 100 according to the present embodiment. In FIG. 1, a semiconductor device 100 includes a pixel circuit region 22 and a readout circuit region 23.

The pixel circuit region 22 includes a first pixel circuit region 22*a* and a second pixel circuit region 22*b*. The first pixel circuit region 22*a* includes a plurality of pixel units 103 arranged two-dimensionally over a plurality of rows and a plurality of columns. The pixel unit 103 includes a photoelectric conversion element that outputs a signal corresponding to incident light. In the example illustrated in FIG. 1, the first pixel circuit region 22*a* includes 25 pixel units 103 arranged in five rows from the first row to the fifth row and five columns from the first column to the fifth column. In FIG. 1, reference numerals indicating row numbers and column numbers are illustrated in boxes indicating the pixel units 103. For example, "S14" is expressed in the pixel units 103 arranged in the first row and the fourth column. The number of rows and the number of columns of the pixel units 103 included in the first pixel circuit region 22*a* are not particularly limited.

The second pixel circuit region 22*b* includes a plurality of signal generation units 104 arranged in one row and one column along the first pixel circuit region 22*a*. In the example illustrated in FIG. 1, the second pixel circuit region 22*b* includes eleven signal generation units 104 arranged in each column of the zeroth row and each row of the zeroth column. In FIG. 1, reference numerals indicating column numbers and row numbers are illustrated in boxes indicating the signal generation units 104. The signal generation units 104 arranged in the zeroth column to the fifth column of the zeroth row are denoted by "S00" to "S05". The signal generation units 104 arranged in the first to fifth rows of the zeroth column are denoted by "S10" to "S50". In this manner, the plurality of signal generation units 104 are arranged corresponding to at least a part of the plurality of rows and the plurality of columns of the plurality of pixel units 103. The arrangement of the number of rows, the number of columns, and the like of the second pixel circuit region 22*b* is not limited to those illustrated in the drawings. Since the second pixel circuit region 22*b* does not include the pixel unit 103, the second pixel circuit region 22*b* may be optically shielded by a light-shielding layer or the like.

The readout circuit region 23 (readout unit) includes a vertical scanning circuit 110, a column circuit 112, a horizontal scanning circuit 111, a control pulse generation unit 115, and a signal output circuit 114. In each row of the plurality of pixel units 103 and the signal generation unit 104 in the pixel circuit region 22, a plurality of control lines 116 are arranged so as to extend in a first direction (lateral direction in FIG. 1). Each of the plurality of control lines 116 is connected to the pixel units 103 and the signal generation unit 104 aligned in the first direction, and forms a common signal line. The first direction in which the control lines 116 extend may be referred to as a row direction or a horizontal direction. In FIG. 1, each of the control lines 116 is denoted by a reference numeral attached with a row number. For example, the control line 116 in the first row is expressed as "VSEL [1]".

The control line 116 in each row is connected to the vertical scanning circuit 110. The vertical scanning circuit 110 supplies control signals for driving the pixel unit 103 and the signal generation unit 104 to the pixel unit 103 and the signal generation unit 104 via the control line 116.

A signal line 113 is arranged in each column of the plurality of pixel units 103 and the signal generation unit 104 in the pixel circuit region 22 so as to extend in a second direction (vertical direction in FIG. 1) intersecting the first direction. Each of the signal lines 113 is connected to the pixel units 103 and the signal generation units 104 aligned in the second direction, and forms a common signal line. The second direction in which the signal lines 113 extend may be referred to as a column direction or a vertical direction.

In FIG. 1, each of the signal lines 113 is denoted by a reference numeral attached with a column number. For example, the signal line 113 in the fourth column is denoted by "POUT4". Each of the signal lines 113 includes n signal lines for transmitting n-bit digital signal. The signal line 113 is connected to the column circuit 112. The column circuit 112 is provided corresponding to each column of the plurality of pixel units 103 and the signal generation units 104 in the pixel circuit region 22, and is connected to the signal line 113 of the corresponding column. The column circuit 112 has a function of holding signals read out from the pixel unit 103 and the signal generation unit 104 via the signal line 113 of the corresponding columns.

The horizontal scanning circuit 111 supplies a control signal for reading out a signal from the column circuit 112 to the column circuit 112. The horizontal scanning circuit 111 supplies a control signal to the column circuit 112 of each column via a control line 117. The column circuit 112 that has received the control signal from the horizontal scanning circuit 111 outputs the held signal to the signal output circuit 114 via the horizontal output line HSIG. In FIG. 1, each of the control lines 117 is denoted by a reference numeral indicating a column number. For example, the control line 117 in the fourth column is denoted by "HSEL [4]". The horizontal output line HSIG includes n signal lines for transmitting n-bit digital signal.

The signal output circuit 114 outputs a signal corresponding to the output from the pixel circuit region 22 as the output signal SOUT of the semiconductor device 100. The control pulse generation unit 115 is driven by the external input clock signal MCLK, and supplies control signals for controlling the operation of the vertical scanning circuit 110, the horizontal scanning circuit 111, and the column circuit 112 and the operation timing thereof. At least a part of control signals for controlling the operation of the vertical scanning circuit 110, the horizontal scanning circuit 111, and the column circuit 112 and the operation timing thereof may be supplied from the outside of the semiconductor device 100.

Figure 2:
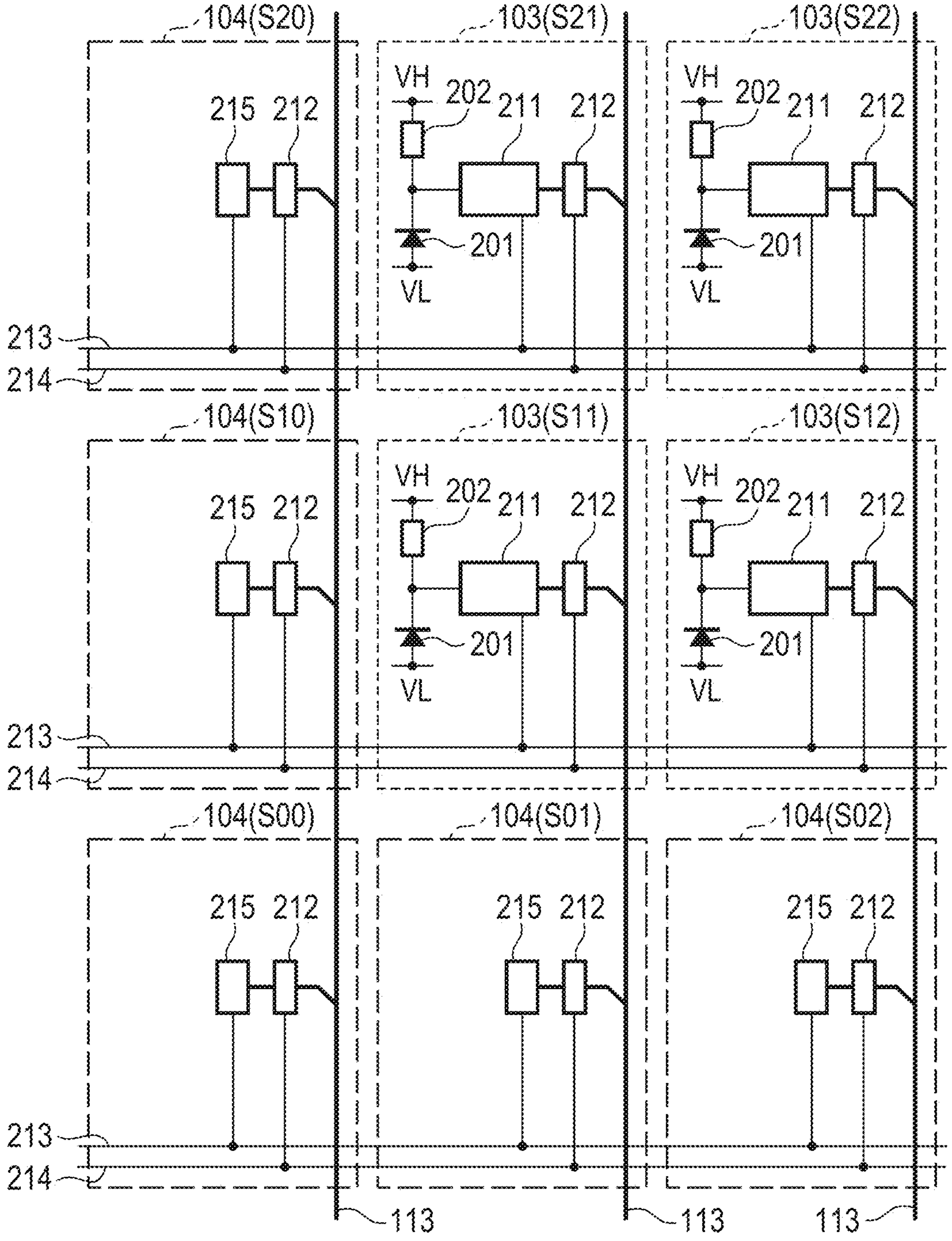
FIG. 2 is an example of an equivalent circuit diagram of a pixel circuit region according to the first embodiment.

FIG. 2 is an example of an equivalent circuit diagram of the pixel circuit region 22 in FIG. 1. For simplicity, FIG. 2 illustrates four pixel units 103 and five signal generation units 104 arranged in the zeroth row to the second row and in the zeroth column to the second column.

Each of the plurality of pixel units 103 includes an avalanche photodiode (hereinafter referred to as APD) 201 as a photoelectric conversion unit, a quench element 202, a signal processing circuit 211, and a selection circuit 212.

When light is incident on the APD 201, a charge pair corresponding to the incident light is generated by photoelectric conversion. A voltage VL (first voltage) is supplied to the anode of the APD 201. A voltage VH (second voltage) higher than the voltage VL supplied to the anode is supplied to the cathode of the APD 201. A reverse bias voltage is supplied to the anode and cathode of the APD 201 so that the APD 201 performs an avalanche multiplication operation. When such a voltage is supplied, the electric charge generated by the incident light causes avalanche multiplication, and an avalanche current is generated. The operation modes when the reverse bias voltage is supplied include a Geiger mode in which the potential difference between the anode and the cathode is greater than the breakdown voltage, and a linear mode in which the potential difference between the anode and the cathode is close to or lower than the breakdown voltage. The APD operated in the Geiger mode is called SPAD.

The quench element 202 is connected between a power supply supplying the voltage VH and the cathode of the APD 201. The quench element 202 has a function of replacing a change in avalanche current generated in the APD 201 with a voltage signal. The quench element 202 functions as a load circuit (quench circuit) at the time of signal multiplication by avalanche multiplication, and functions to suppress avalanche multiplication by suppressing a voltage supplied to the APD 201 (quench operation).

The signal processing circuit 211 (first signal generation unit) has a function of counting a change in the potential of the cathode of the APD 201 obtained at the time of photon detection. This function can be realized by, for example, providing the signal processing circuit 211 with a counter circuit that counts pulses generated by a change in the potential of the cathode. Thus, the signal processing circuit 211 can output a count value (first digital signal) corresponding to the number of photons incident on the APD 201. The signal processing circuit 211 performs such as an initialization of a counter circuit in response to a control signal input via the control line 213.

The selection circuit 212 controls electrical connection and disconnection between the signal processing circuit 211 and the signal line 113 by a control signal supplied from the vertical scanning circuit 110 of FIG. 1 via the control line 214. The selection circuit 212 includes, for example, a switch for controlling electrical connection or disconnection, a buffer circuit for outputting a signal, and the like.

In the present embodiment, the pixel unit 103 has a function of outputting a count value of photons incident on the APD 201 as a digital signal, but the pixel unit 103 is not limited thereto. The signal processing circuit 211 may include a time-to-digital conversion circuit (time-to-digital converter: TDC) and a memory. In this case, the pixel unit 103 is typically a pixel for forming an image, but when the pixel unit 103 is used for a time of flight (TOF), the pixel unit 103 may not necessarily form an image. That is, the pixel unit 103 may be a pixel for measuring the time at which light reaches and the amount of light.

Each of the plurality of signal generation units 104 includes a signal generation circuit 215 and a selection circuit 212. The signal generation circuit 215 (second signal generation unit) is configured to output a digital signal (second digital signal) having a predetermined digital value of n bits (n is a natural number). This digital signal can be used, for example, for inspections of a wiring, circuit operation, and the like in the readout circuit region 23. The signal generation circuit 215 performs processing related to signal generation such as initialization in response to a control signal input via the control line 213. The selection circuit 212 of the signal generation unit 104 controls electrical connection and disconnection between the signal generation circuit 215 and the signal line 113 by a control signal supplied from the vertical scanning circuit 110 of FIG. 1 via the control line 214.

Thus, the digital signal having the count value output from the signal processing circuit 211 or the predetermined n-bit digital value output from the signal generation circuit 215 in a row selected by the vertical scanning circuit 110 is output to the signal line 113. These signals are stored in the column circuit 112, and are output to the outside of the semiconductor device 100 via the signal output circuit 114 in response to scanning by the horizontal scanning circuit 111.

Here, a specific example of a predetermined digital value output from the signal generation circuit 215 will be described with reference to FIGS. 3A to 3D. FIGS. 3A to 3D are conceptual diagrams for explaining an output signal of the signal generation unit 104 according to the present embodiment. FIGS. 3A to 3D illustrate values of n-bit digital signals output from the signal generation circuit 215. In this example, the digital signal has a plurality of bits (that is, n is an integer of 2 or more). Note that "MSB" in the figure represents the most significant bit, and "LSB" in the figure represents the least significant bit. In the following description, the "k-th bit" means a bit at the k-th position counted from the lowest order. That is, it is assumed that LSB in FIGS. 3A to 3D is the first bit (that is, odd-numbered bits), and MSB in FIGS. 3A to 3D is the n-th bit. Further, the digital signal of the present embodiment is assumed to be a positive logic in which the low level corresponds to "0" and the high level corresponds to "1", but may be a negative logic opposite thereto.

Figure 3A:
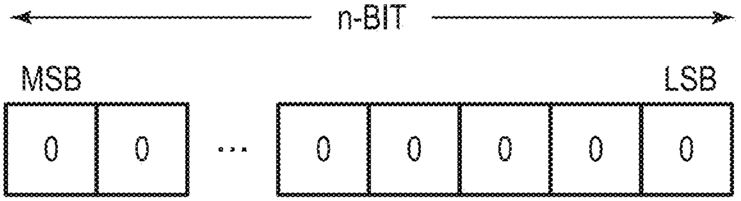
FIGS. 3A, 3B, 3C and 3D are conceptual diagrams for explaining output signals of the signal generation unit according to the first embodiment.
Figure 3B:
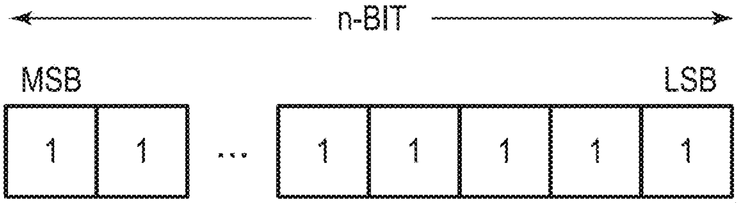

FIG. 3A illustrates an example in which all bits are "0" (low level). FIG. 3B illustrates an example in which all bits are "1" (high level). Thus, all bits of the digital signal output from the signal generation circuit 215 may have the same level.

Figure 3C:
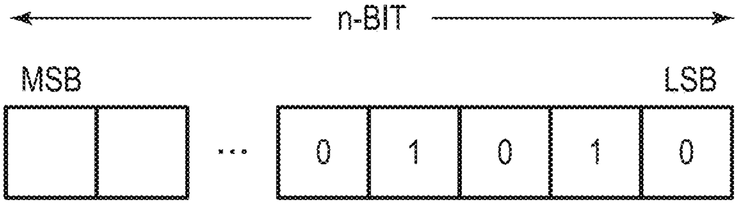
Figure 3D:
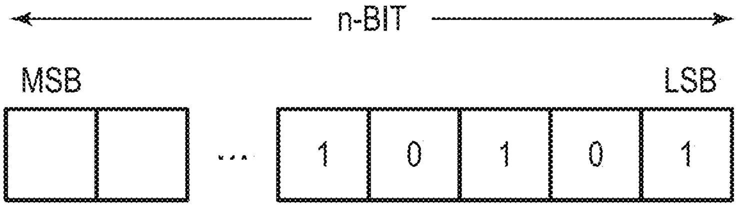

FIG. 3C illustrates an example in which all odd-numbered bits are "0" and all even-numbered bits are "1". FIG. 3D illustrates an example in which all odd-numbered bits are "1" and all even-numbered bits are "0". In this way, the digital signal output from the signal generation circuit 215 may alternately repeat the high level and the low level in the bits.

Signals based on incident light are unlikely to be regular as described above. Therefore, by using the digital signal having the regular bit value as described above for the inspection signal, it is possible to avoid confusion between the signal based on the incident light and the inspection signal. In addition, since the bit values are regular, it becomes easy to detect a variation of the output test signal that has occurred due to a problem such as a wiring, circuit operation, or the like in the readout circuit region 23.

Note that the digital signals described above are merely examples. Any other format may be used as long as the format is predefined so that the reception side can determine that the signal is an inspection signal.

All of the plurality of digital signals output by the plurality of signal generation units 104 in the second pixel circuit region 22*b* need not have the same value. For example, the values of the digital signals output by the signal generation unit 104 may differ from row to row. Each of the signal generation circuits 215 may be configured to selectively output one of a plurality of values.

Figure 4:
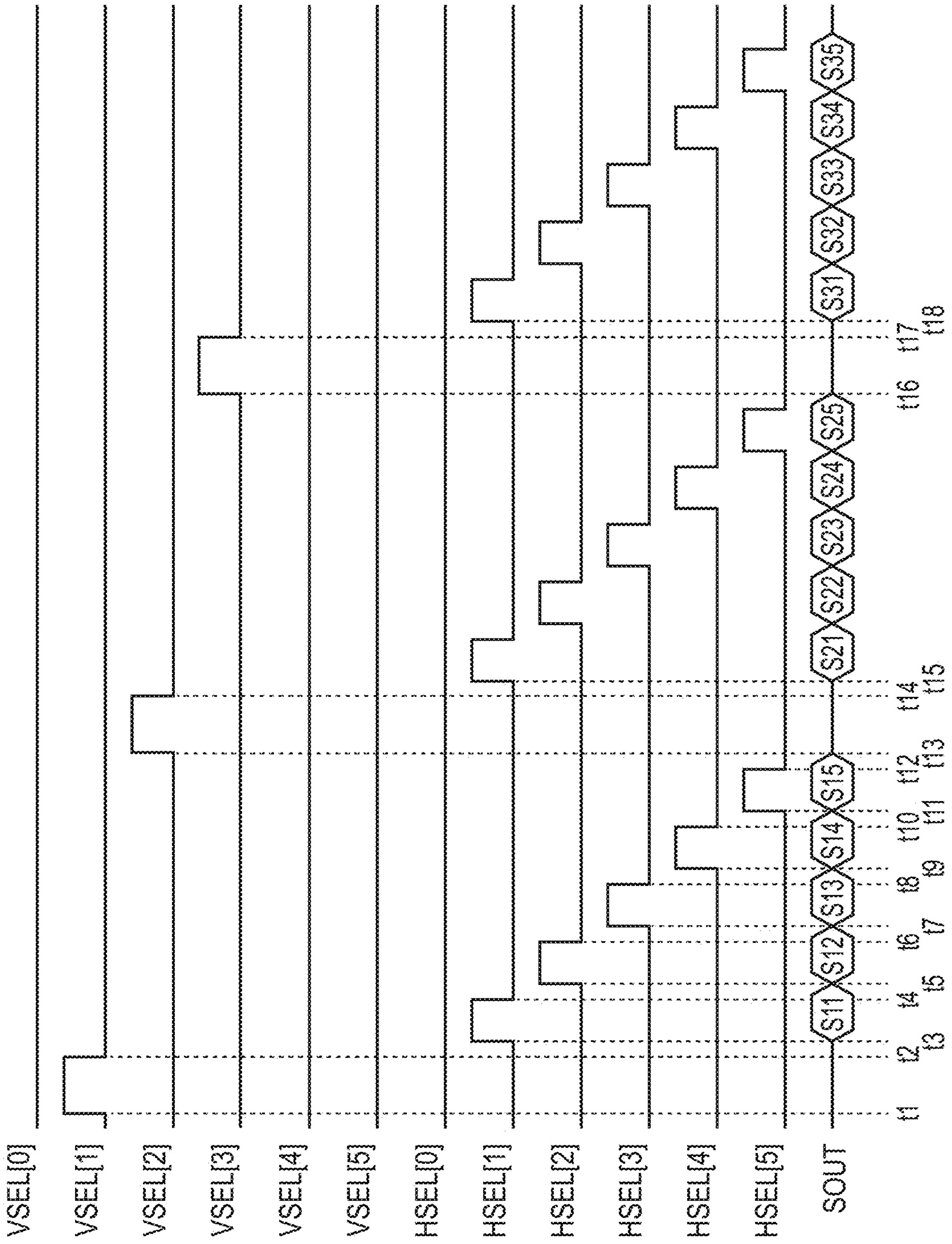
FIG. 4 is an example of a timing chart in a normal mode of the semiconductor device according to the first embodiment.
Figure 5:
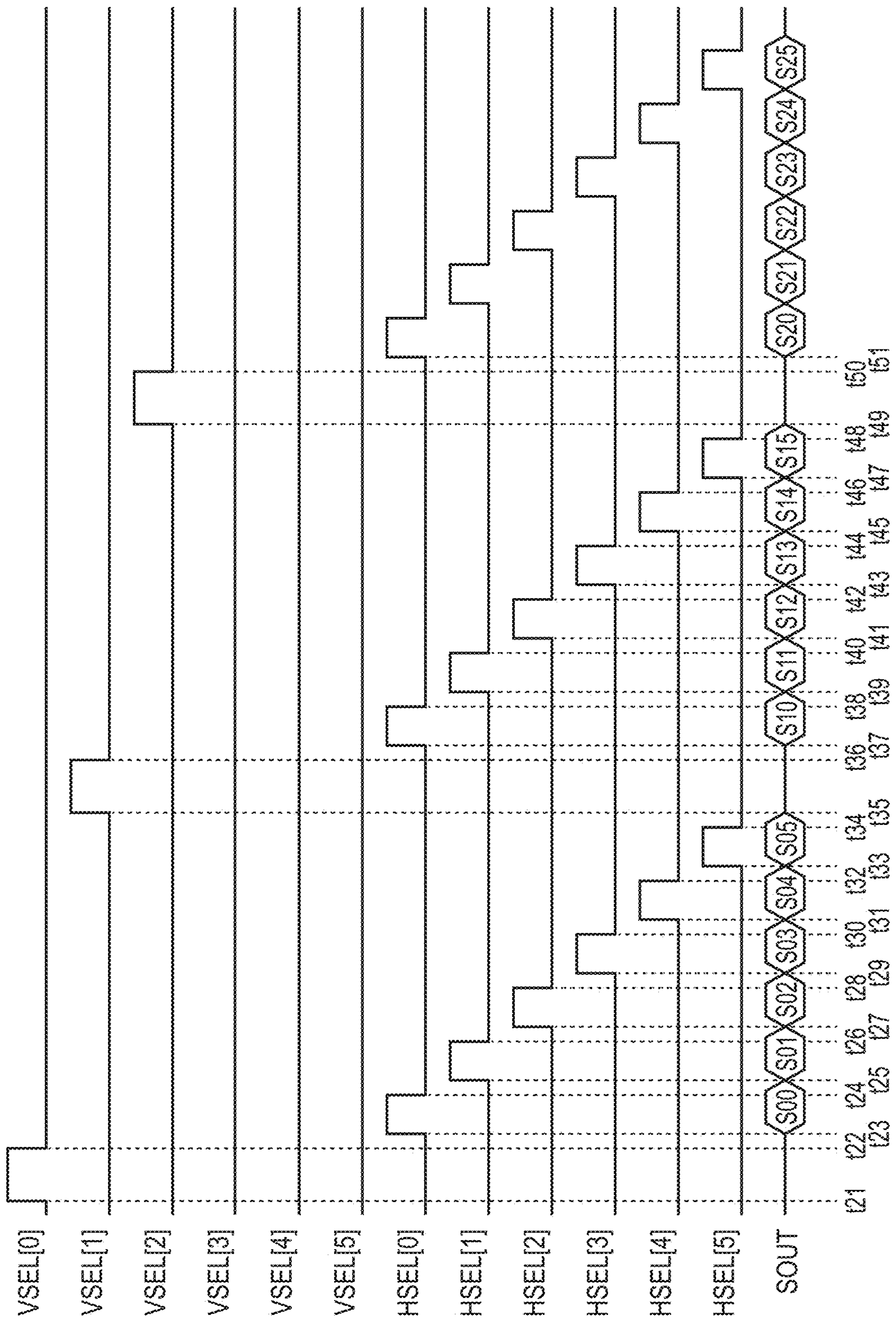
FIG. 5 is an example of a timing chart in an inspection mode of the semiconductor device according to the first embodiment.

FIGS. 4 and 5 are timing charts for explaining the operation of the semiconductor device 100 of the present embodiment. The semiconductor device 100 of the present embodiment is configured to operate in a normal mode (first mode) and an inspection mode (second mode). In the normal mode, the semiconductor device 100 does not output the inspection signals corresponding to the outputs from the plurality of signal generation units 104, but outputs the pixel signals corresponding to the outputs from the plurality of pixel units 103. In the inspection mode, the semiconductor device 100 outputs inspection signals corresponding to the outputs from the plurality of signal generation units 104. FIG. 4 is an example of a timing chart in the normal mode, and FIG. 5 is an example of a timing chart in the inspection mode. FIGS. 4 and 5 illustrate the timing of signals supplied from the vertical scanning circuit 110 to the control lines VSEL[0] to VSEL[5], and the timing of signals supplied from the horizontal scanning circuit 111 to the control lines HSEL[0] to HSEL[5]. FIGS. 4 and 5 illustrates the output timing of the output signal SOUT and the position of the pixel unit 103 or the signal generation unit 104 corresponding to the output signal SOUT.

First, an example of the operation in the normal mode will be described with reference to FIG. 4. At time t1, the potential of the control line VSEL[1] becomes high level, and thereafter, at time t2, the potential of the control line VSEL[1] becomes low level. Thus, in a period from time t1 to time t2, signals are output from the plurality of pixel units

103 in the first row, and are held in the column circuit 112 via the signal lines 113 corresponding to the respective columns.

At time t3, the potential of the control line HSEL[1] becomes high level, and thereafter, at time t4, the potential of the control line HSEL[1] becomes low level. Thus, the signal is output from the column circuit 112 of the first column to the signal output circuit 114 within the period from the time t3 to the time t4. The signal output circuit 114 outputs an output signal SOUT including a pixel signal corresponding to the output from the pixel unit 103 (S11) in the first row and the first column.

At time t5, the potential of the control line HSEL[2] becomes high level, and thereafter, at time t6, the potential of the control line HSEL[2] becomes low level. Thus, the signal is output from the column circuit 112 of the second column to the signal output circuit 114 within the period from the time t5 to the time t6. The signal output circuit 114 outputs an output signal SOUT including a pixel signal corresponding to the output from the pixel unit 103 (S12) in the first row and the second column.

In the period from time t7 to time t8, the period from time t9 to time t10, and the period from time t11 to time t12, signal output processes from the column circuits 112 of the third and subsequent columns are repeated. That is, the signal output circuit 114 sequentially outputs the output signals SOUT including the pixel signals corresponding to the outputs from the pixel units 103 (S13 to S15) in the first row and the third column to the first row and the fifth column.

At time t13, the potential of the control line VSEL[2] becomes high level, and thereafter, at time t14, the potential of the control line VSEL[2] becomes low level. Thus, in a period from time t13 to time t14, signals are output from the plurality of pixel units 103 in the second row, and are held in the column circuit 112 via the signal lines 113 corresponding to the respective columns.

After time t15, similarly to the period from time t3 to time t12, the output signals SOUT including the pixel signals corresponding to the outputs from the pixel units 103 (S21 to S25) in each column of the second row is sequentially output. Similarly, in the third row and the following rows, the output signals SOUT including the pixel signals corresponding to the outputs of the pixel units 103 in the first pixel circuit region 22*a* is sequentially output row by row and column by column. Thus, in the normal mode, the semiconductor device 100 outputs pixel signals corresponding to the outputs from the plurality of pixel units 103, but does not output inspection signals corresponding to the outputs from the plurality of signal generation units 104. In the normal state in which the inspection is not performed in this way, the output of the inspection signal is omitted, thereby speeding up the processing such as readout.

Next, an example of the operation in the inspection mode will be described with reference to FIG. 5. At time t21, the potential of the control line VSEL[0] becomes high level, and thereafter, at time t22, the potential of the control line VSEL[0] becomes low level. Thus, in a period from time t21 to time t22, signals are output from the plurality of signal generation units 104 in the zeroth row, and are held in the column circuit 112 via the signal lines 113 corresponding to the respective columns.

At time t23, the potential of the control line HSEL[0] becomes high level, and thereafter, at time t24, the potential of the control line HSEL[0] becomes low level. Thus, the signal is output from the column circuit 112 of the zeroth column to the signal output circuit 114 within the period from the time t23 to the time t24. The signal output circuit 114 outputs the output signal SOUT including the inspection signal corresponding to the output from the signal generation unit 104 (S00) in the zeroth row and the zeroth column.

At time t25, the potential of the control line HSEL[1] becomes high level, and thereafter, at time t26, the potential of the control line HSEL[1] becomes low level. Thus, the signal is output from the column circuit 112 of the first column to the signal output circuit 114 within the period from the time t25 to the time t26. The signal output circuit 114 outputs an output signal SOUT including an inspection signal corresponding to the output from the signal generation unit 104 (S01) in the zeroth row and the first column.

In the period from time t27 to time t28, the period from time t29 to time t30, the period from time t31 to time t32, and the period from time t33 to time t34, the signal output processes from the column circuits 112 of the second and subsequent columns are repeated. That is, the signal output circuit 114 sequentially outputs the output signals SOUT including the inspection signals corresponding to the outputs from the signal generation units 104 (S02 to S05) in the zeroth row and the second column to the zeroth row and the fifth column.

At time t35, the potential of the control line VSEL[1] becomes high level, and thereafter, at time t36, the potential of the control line VSEL[1] becomes low level. Thus, in a period from time t35 to time t36, signals are output from the signal generation unit 104 in the first row and the zeroth column and the plurality of pixel units 103 in the first row, and are held in the column circuit 112 via the signal lines 113 corresponding to the respective columns.

At time t37, the potential of the control line HSEL[0] becomes high level, and thereafter, at time t38, the potential of the control line HSEL[0] becomes low level. Thus, the signal is output from the column circuit 112 of the zeroth column to the signal output circuit 114 within the period from the time t37 to the time t38. The signal output circuit 114 outputs the output signal SOUT including the inspection signal corresponding to the output from the signal generation unit 104 (S10) in the first row and the zeroth column.

At time t39, the potential of the control line HSEL[1] becomes high level, and thereafter, at time t40, the potential of the control line HSEL[1] becomes low level. Thus, the signal is output from the column circuit 112 of the first column to the signal output circuit 114 within the period from the time t39 to the time t40. The signal output circuit 114 outputs an output signal SOUT including a pixel signal corresponding to the output from the pixel unit 103 (S11) in the first row and the first column.

In the period from time t41 to time t42, the period from time t43 to time t44, the period from time t45 to time t46, and the period from time t47 to time t48, the signal output processes from the column circuits 112 of the second and subsequent columns is repeated. That is, the signal output circuit 114 sequentially outputs the output signals SOUT including the pixel signals corresponding to the outputs from the pixel units 103 (S12 to S15) in the first row and the second column to the first row and the fifth column.

At time t49, the potential of the control line VSEL[2] becomes high level, and thereafter, at time t50, the potential of the control line VSEL[2] becomes low level. Thus, in a period from time t49 to time t50, signals are output from the signal generation unit 104 in the second row and the zeroth column and the plurality of pixel units 103 in the second row, and are held in the column circuit 112 via the signal lines 113 corresponding to the respective columns.

After the time t51, similarly to the period from the time t37 to the time t48, the output signals SOUT including the inspection signal or the pixel signals corresponding to the outputs from the signal generation unit 104 (S20) or the pixel units 103 (S21 to S25) of each column of the second row are sequentially output. Similarly, in the third row and the following rows, the output signals SOUT including the inspection signals or the pixel signals corresponding to the outputs of the signal generation units 104 in the second pixel circuit region 22*b* or the pixel units 103 in the first pixel circuit region 22*a* are sequentially output row by row and column by column. Thus, in the inspection mode, the semiconductor device 100 outputs both the pixel signals corresponding to the outputs from the plurality of pixel units 103 and the inspection signals corresponding to the outputs from the plurality of signal generation units 104.

Thus, the semiconductor device 100 of the present embodiment can operate in the inspection mode. In the inspection mode, the semiconductor device 100 outputs signals including inspection signals corresponding to the outputs from the plurality of signal generation units 104 arranged along the first pixel circuit region 22*a*. At this time, the plurality of signal generation units 104 are configured to output predetermined digital signals as illustrated in FIGS. 3A to 3D. By checking whether or not the digital signal that is output in the inspection mode matches the above-described predetermined digital signal, it is possible to inspect a state of an element existing in a path through which the predetermined digital signal passes, for example, a wiring or a circuit operation in the readout circuit region 23.

As described above, in the present embodiment, in the inspection mode, the inspection signal can be output without being based on the incident light. Therefore, according to the present embodiment, the semiconductor device 100 capable of outputting a digital signal including information other than information based on incident light is provided.

When the digital signal for inspection is based on incident light, the value of the digital signal varies depending on the amount of incident light, and thus appropriate inspection may be difficult. Even in this case, it is possible to generate an appropriate inspection signal by, for example, generating a digital signal for inspection while keeping the amount of incident light constant, but special processing for inspection is required, and inspection processing may be complicated. In addition, a long inspection time may be required to perform complicated inspection. This problem may be more pronounced when the object to be inspected includes an avalanche photodiode with high sensitivity to incident light. On the other hand, since the inspection signal that is output from the semiconductor device 100 of the present embodiment is a digital signal having a predetermined digital value independent of incident light, inspection is simplified. Therefore, according to the present embodiment, the semiconductor device 100 capable of simplifying the inspection is provided.

In the present embodiment, the semiconductor device 100 can output both the pixel signals corresponding to the outputs from the plurality of pixel units 103 and the inspection signals corresponding to the outputs from the plurality of signal generation units 104 in the inspection mode. Accordingly, since the pixel signal can be output in the same manner as in the normal mode even in the inspection mode, the inspection based on the inspection signal can be performed in parallel with the output of the pixel signal.

Note that the above-described inspection may be performed, for example, in an inspection step in which an inspection such as determination of quality is performed in a manufacturing process of the semiconductor device 100. In this case, the inspection process may be performed on the finished semiconductor device 100 or the semi-finished semiconductor device 100. Further, the above-described inspection may be performed to inspect the device state at the time of use or the like after shipment of the semiconductor device 100.

As illustrated in FIG. 1, the plurality of signal generation units 104 are preferably arranged so as to correspond to all the rows of the plurality of pixel units 103. According to this configuration, it is possible to inspect the function of selecting a row in the readout circuit region 23 for all the rows. As illustrated in FIG. 1, the plurality of signal generation units 104 are preferably arranged to correspond to all the columns of the plurality of pixel units 103. According to this configuration, it is possible to inspect the function of signal readout in the readout circuit region 23 for all columns. However, it is not essential that the plurality of signal generation units 104 be arranged to correspond to all the rows or all the columns of the plurality of pixel units 103.

Second Embodiment

This embodiment is a modified example of the operation timing in the inspection mode in the first embodiment. In the present embodiment, the configuration other than the operation timing in the inspection mode is the same as that in the first embodiment, and a description thereof will be omitted.

Figure 6:
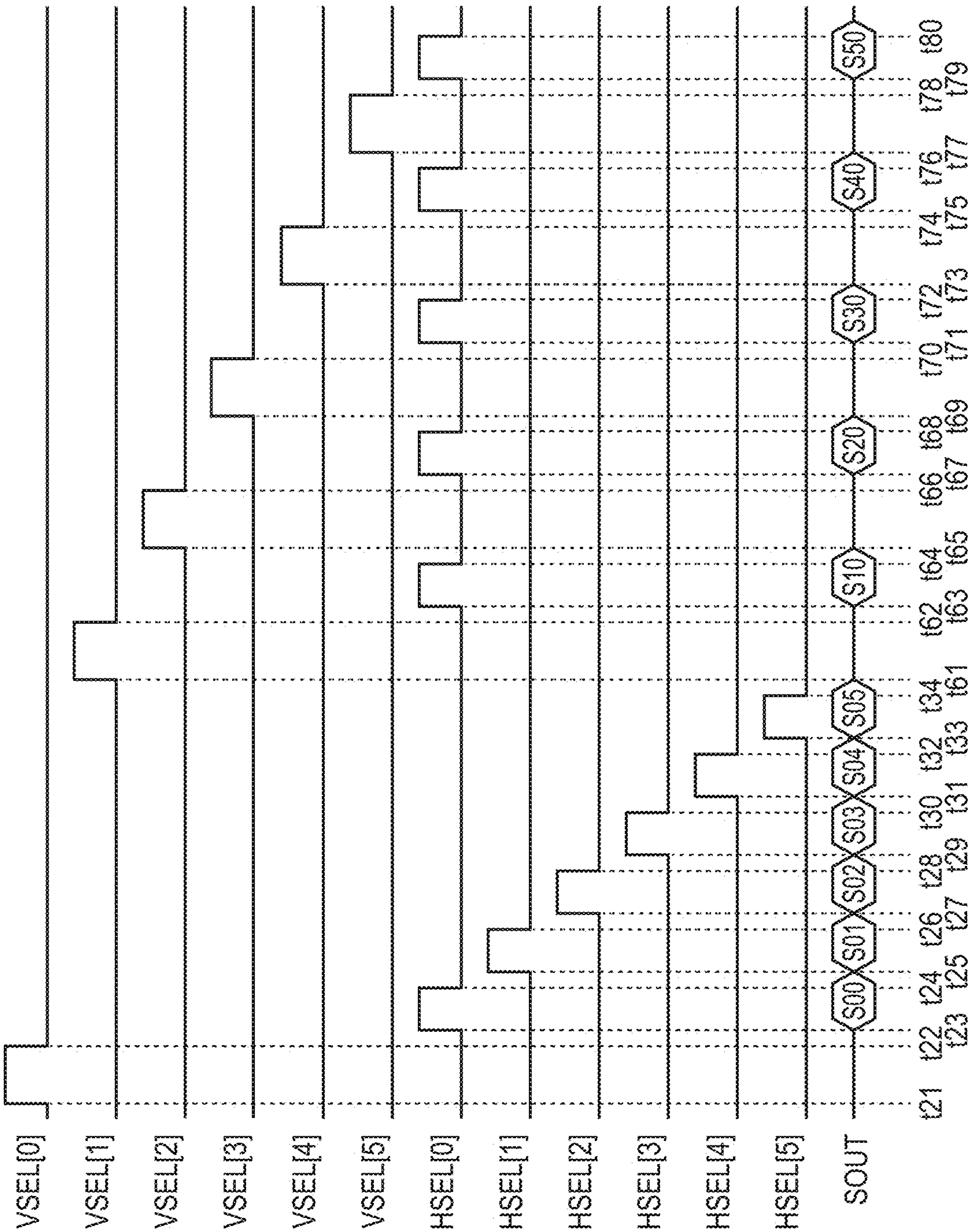
FIG. 6 is an example of a timing chart in an inspection mode of a semiconductor device according to a second embodiment.

FIG. 6 is an example of a timing chart in the inspection mode of the semiconductor device 100 according to the present embodiment. Since the operation from time t21 to time t34 in FIG. 6 is the same as the operation from time t21 to time t34 in FIG. 5, the description thereof will be omitted. That is, in this period, the signal output circuit 114 sequentially outputs the output signals SOUT including the inspection signals corresponding to the outputs from the signal generation units 104 (S00 to S05) in the zeroth row and the zeroth column to the zeroth row and the fifth column.

At time t61, the potential of the control line VSEL[1] becomes high level, and thereafter, at time t62, the potential of the control line VSEL[1] becomes low level. Thus, in a period from time t61 to time t62, signals are output from the signal generation unit 104 in the first row and the zeroth column and the plurality of pixel units 103 in the first row, and are held in the column circuit 112 via the signal lines 113 corresponding to the respective columns.

At time t63, the potential of the control line HSEL[0] becomes high level, and thereafter, at time t64, the potential of the control line HSEL[0] becomes low level. Thus, the signal is output from the column circuit 112 of the zeroth column to the signal output circuit 114 within the period from the time t63 to the time t64. The signal output circuit 114 outputs the output signal SOUT including the inspection signal corresponding to the output from the signal generation unit 104 (S10) in the first row and the zeroth column.

At time t65, the potential of the control line VSEL[2] becomes high level, and thereafter, at time t66, the potential of the control line VSEL[2] becomes low level. Thus, in the period from time t65 to time t66, signals are output from the signal generation unit 104 in the second row and the zeroth column and the plurality of pixel units 103 in the second row, and are held in the column circuit 112 via the signal lines 113 corresponding to the respective columns.

At time t67, the potential of the control line HSEL[0] becomes high level, and thereafter, at time t68, the potential of the control line HSEL[0] becomes low level. Thus, the signal is output from the column circuit 112 of the zeroth column to the signal output circuit 114 within the period from the time t67 to the time t68. The signal output circuit 114 outputs the output signal SOUT including the inspection signal corresponding to the output from the signal generation unit 104 (S20) in the second row and the zeroth column.

Similarly, in the third row and the following rows, the output signals SOUT including the inspection signals corresponding to the outputs of the signal generation units 104 in the second pixel circuit region 22*b* is sequentially output for each row.

In the operation timing of the present embodiment, in the inspection mode, the semiconductor device 100 does not output the pixel signals from the plurality of pixel units 103, but outputs only the inspection signals corresponding to the outputs from the plurality of signal generation units 104. Thus, since the number of signals to be output can be reduced, the present embodiment provides the semiconductor device 100 in which inspection can be further simplified. When the output time of the signal is the bottleneck of the inspection time, the inspection time can be reduced by reducing the number of signals to be output by applying the operation timing of the present embodiment.

Third Embodiment

This embodiment is a modified example of the pixel circuit region 22 in the first embodiment. In the present embodiment, since the circuit configuration of the pixel circuit region 22 and the configuration other than the signal supplied to the counter circuit included in the circuit are the same as those in the first embodiment, description thereof will be omitted.

Figure 7:
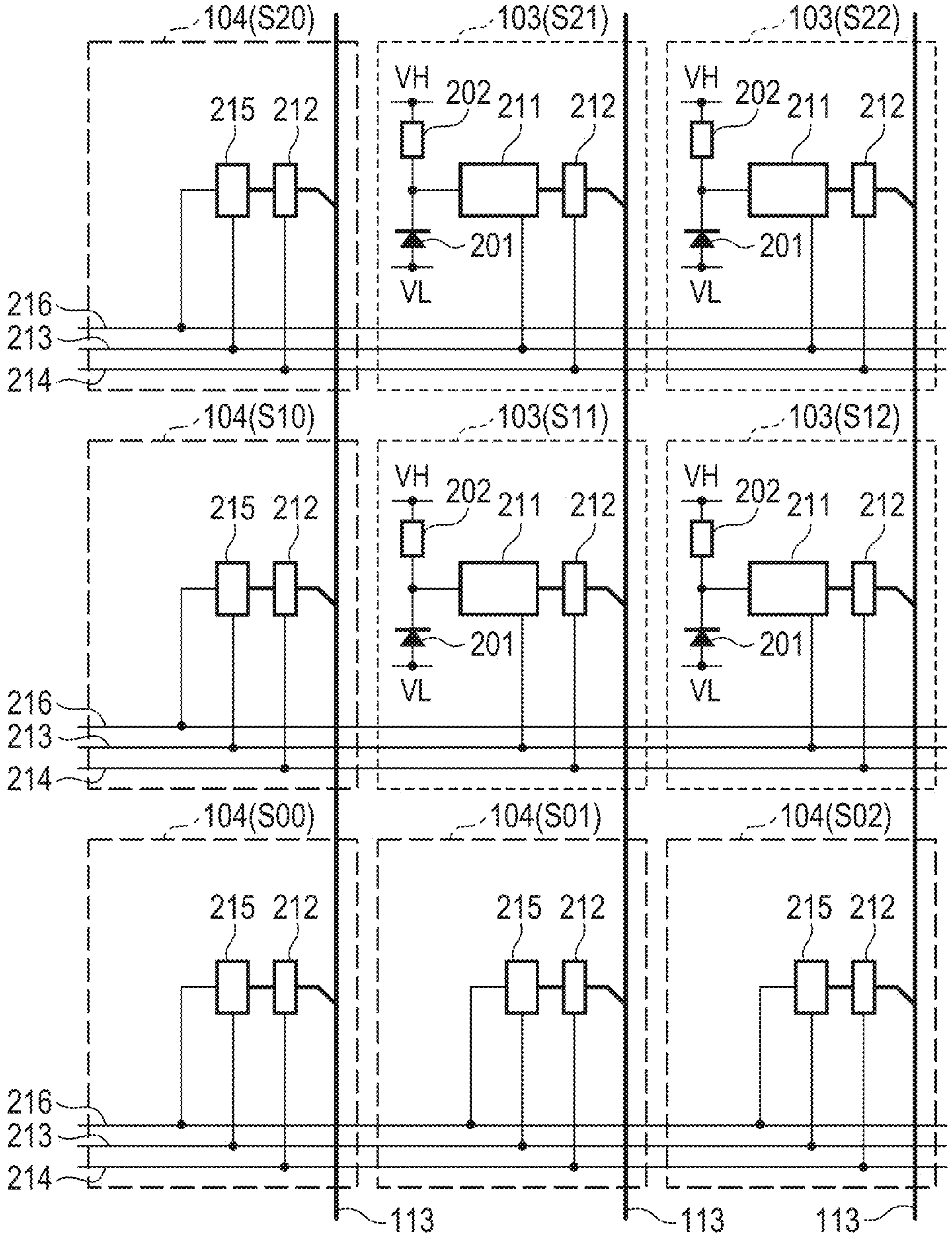
FIG. 7 is an example of an equivalent circuit diagram of a pixel circuit region according to a third embodiment.

FIG. 7 is an example of an equivalent circuit diagram of the pixel circuit region 22 according to the present embodiment. In the present embodiment, the signal generation circuit 215 provided in each of the plurality of signal generation units 104 has a function of counting pulses of a control signal input via the signal line 216. This function can be realized by, for example, providing the signal generation circuit 215 with a counter circuit for counting pulses. The signal generation circuit 215 initializes a count value held in response to a control signal input via the control line 213. In each row, the signal line 216 is commonly connected to the signal generation circuits 215 in the same row. In each row, the control line 213 is commonly connected to the signal generation circuit 215 and the signal processing circuits 211 in the same row.

Figure 8A:
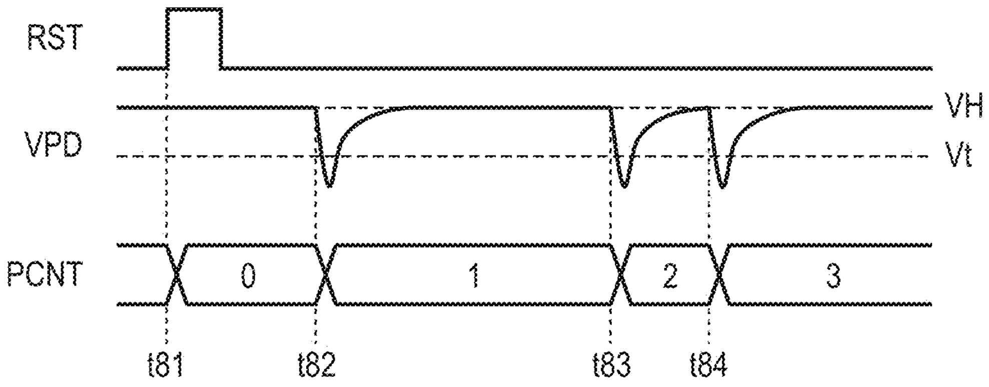
FIGS. 8A and 8B are timing charts for explaining a count operation in a signal processing circuit and a signal generation circuit according to the third embodiment.
Figure 8B:
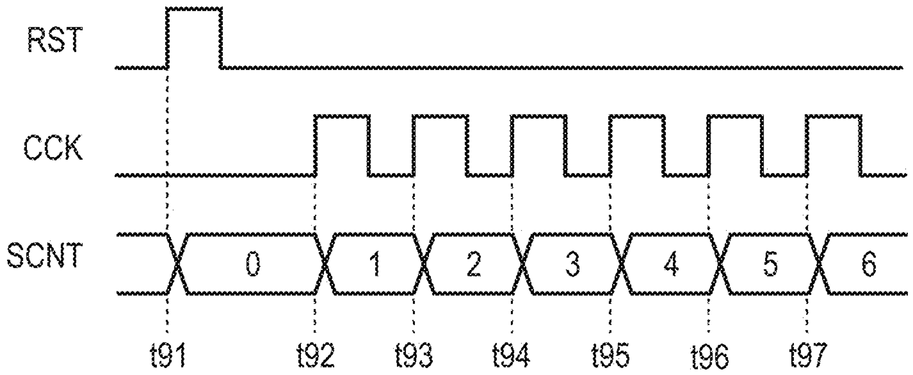

FIG. 8A is an example of a timing chart for explaining the count operation in the signal processing circuit 211 according to the present embodiment, and FIG. 8B is an example of a timing chart for explaining the count operation in the signal generation circuit 215 according to the present embodiment.

First, the operation of the signal processing circuit 211 will be described with reference to FIG. 8A. FIG. 8A illustrates a signal RST supplied to the control line 213, a cathode potential VPD of the APD 201, and a count value PCNT output from the signal processing circuit 211. In FIG. 8A, the voltage VH applied to the cathode and a threshold value Vt of the count are indicated by broken lines in the cathode potential VPD.

When the signal RST becomes high level at time t81, the signal processing circuit 211 is reset and the count value PCNT becomes "0". Thereafter, when a photon enters the APD 201 at time t82 after the signal RST becomes low, the cathode potential VPD drops based on the avalanche multiplication. When the cathode potential VPD becomes lower than the threshold value Vt, the count value PCNT changes from "0" to "1". Similarly, when another photon enters the APD 201 at time t83, the count value PCNT changes from "1" to "2", and when yet another photon enters the APD 201 at time t84, the count value PCNT changes from "2" to "3". In this way, the signal processing circuit 211 counts the number of times the cathode potential of the APD 201 changes when photons are detected.

Next, the operation of the signal generation circuit 215 will be described with reference to FIG. 8B. FIG. 8B illustrates the signal RST supplied to the control line 213, a signal CCK supplied to the signal line 216, and a count value SCNT output from the signal generation circuit 215.

When the signal RST becomes high level at time t91, the signal generation circuit 215 is reset and the count value SCNT becomes "0". Thereafter, when the signal CCK becomes high level at time t92 after the signal RST becomes low level, the count value SCNT changes from "0" to "1". Similarly, at subsequent times t93, t94, t95, t96, and t97, the value of the count value SCNT increases by one every time the signal CCK transits from the low level to the high level. In this way, the signal generation circuit 215 counts the number of pulses of the signal CCK.

In the configuration of the present embodiment, the semiconductor device 100 can set the value of the test signal to be output in accordance with the count number of pulses included in the pulse signal supplied to the signal line 216. Thus, the semiconductor device 100 can be controlled at the time of inspection and the value of the inspection signal can be appropriately set, so that the semiconductor device 100 capable of improving the degree of freedom of the inspection signal can be provided according to the present embodiment.

Fourth Embodiment

This embodiment is a modified example of the output signal SOUT in the first embodiment. In the present embodiment, the circuit configuration and the like of the pixel circuit region 22 are the same as those in the first embodiment, and thus description thereof will be omitted.

Figure 9A:
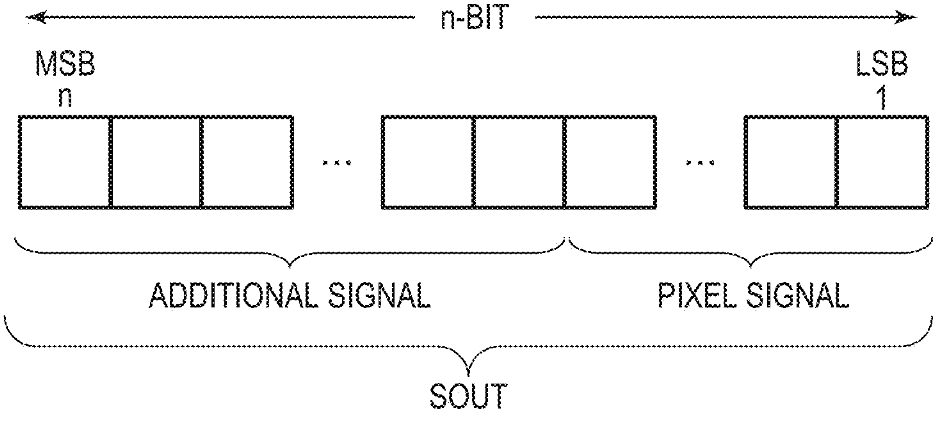
FIGS. 9A and 9B are conceptual diagrams for explaining output signals of a semiconductor device according to a fourth embodiment.
Figure 9B:
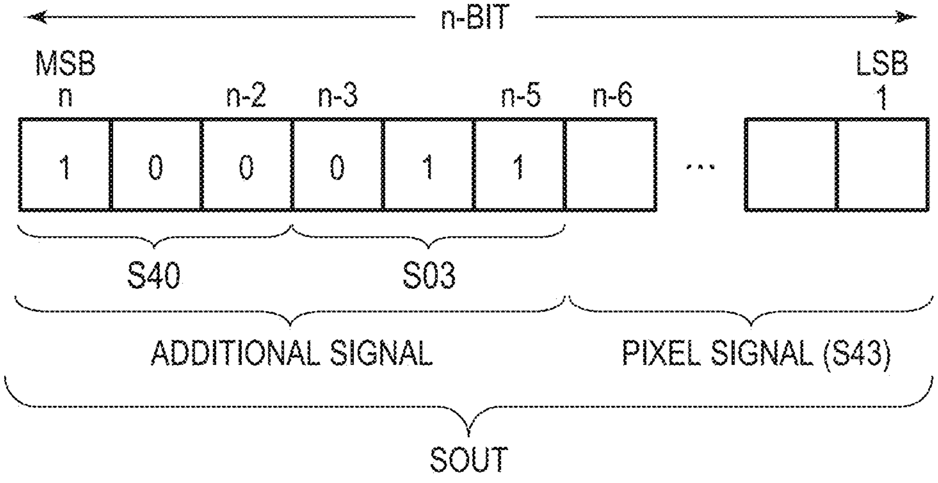

FIGS. 9A and 9B are conceptual diagrams for explaining an output signal SOUT from the semiconductor device 100 according to the present embodiment. In the first embodiment, the output signal SOUT is either the inspection signal or the pixel signal, but in the present embodiment, the output signal SOUT is a signal in which an additional signal, such as the inspection signal, and the pixel signal are coupled.

As illustrated in FIG. 9A, the output signal SOUT is an n-bit digital signal obtained by combining the additional signal and the pixel signal. As in the first embodiment, the pixel signal is a signal corresponding to the output from the pixel unit 103, and the additional signal is a signal corresponding to the output from the signal generation unit 104. The additional signal may provide additional information to the output signal. The additional signal can also be used as an inspection signal as in the first embodiment. The additional signal may be, for example, a signal indicating an address of the pixel circuit region 22. The process of combining the additional signal and the pixel signal may be performed, for example, by the column circuit 112.

FIG. 9B is an example of an output signal SOUT (third digital signal) in which an additional signal indicating an address of the pixel signal is coupled to the pixel signal corresponding to the output from the pixel unit 103 (S43) in the fourth row and the third column. Each of the signal generation units 104 in the second pixel circuit region 22*b* outputs a value corresponding to the position of a corresponding row or column. Here, as an example, it is assumed that the pixel unit 103 (S40) outputs "4" ("100" in the binary notation), and the pixel unit 103 (S03) outputs "3" ("011" in the binary notation). It is assumed that the output signal SOUT is an n-bit digital signal, and the upper 6 bits are additional signals. Further, it is assumed that the upper three bits of the additional signal are assigned to the signal indicating the row number, and the lower three bits are assigned to the signal indicating the column number. At this time, as illustrated in FIG. 9B, the value of the additional signal is "100011" in the binary notation. This additional signal indicates that the address of the pixel signal is the fourth row and the third column. The information indicated by the additional signal may be address information of only a row or only a column, or may be unique information other than the address information.

According to the present embodiment, the semiconductor device 100 can output a signal in which additional information is added to a pixel signal. When the additional information is an address, information about the address of the pixel unit 103 from which the pixel signal is output can be obtained from the additional signal.

Fifth Embodiment

This embodiment is a modified example of the pixel circuit region 22 in the first embodiment. In the present embodiment, the configurations other than the arrangement of the pixel units 103 and the signal generation units 104 in the pixel circuit region 22 are the same as those in the first embodiment, and thus the description thereof will be omitted.

Figure 10:
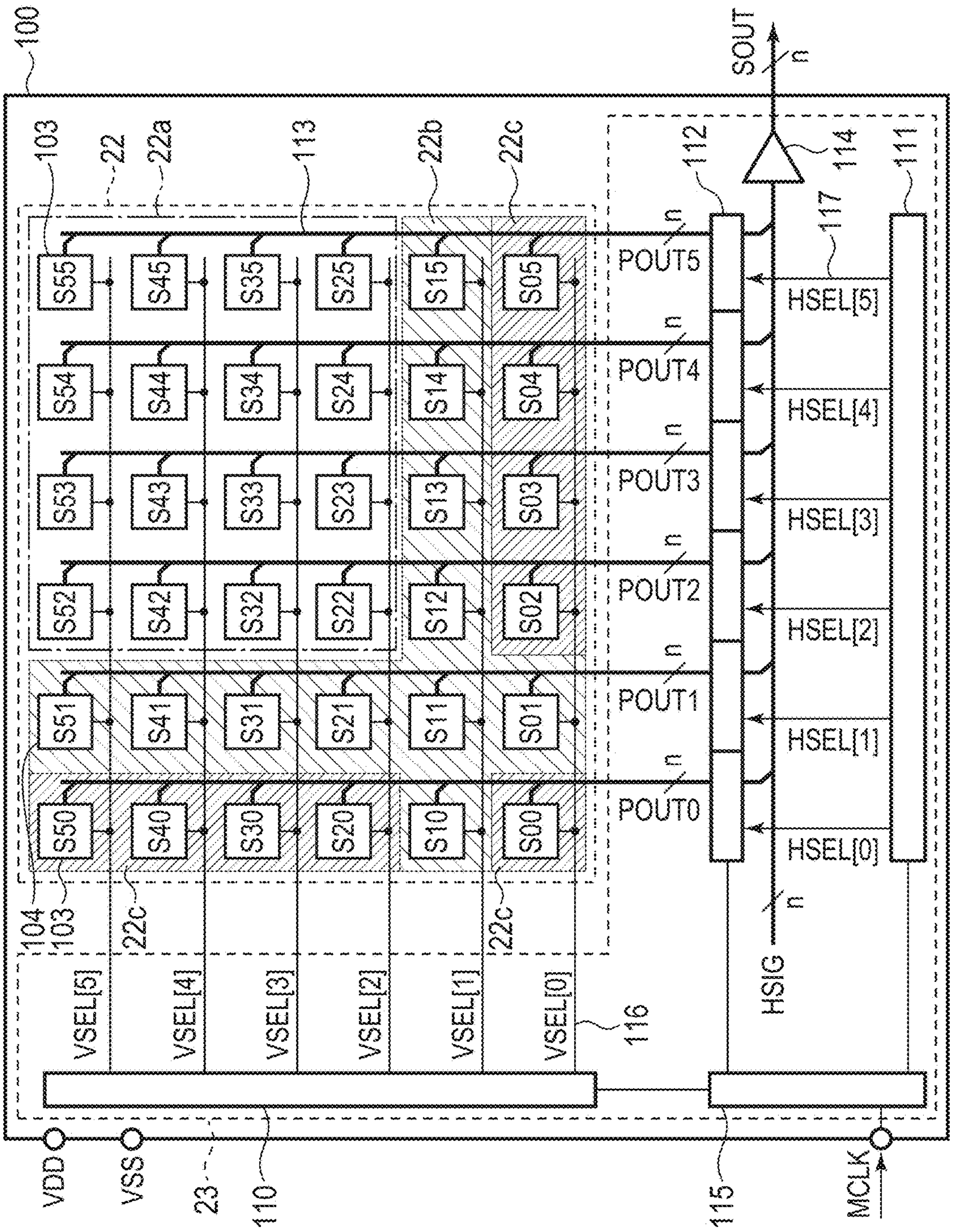
FIG. 10 is an example of a block diagram of a semiconductor device according to a fifth embodiment.

FIG. 10 is an example of a block diagram of a semiconductor device 100 according to the present embodiment. The pixel circuit region 22 includes a first pixel circuit region 22*a*, a second pixel circuit region 22*b*, and a third pixel circuit region 22*c*. The first pixel circuit region 22*a* includes a plurality of pixel units 103 arranged two-dimensionally over a plurality of rows and a plurality of columns. The pixel unit 103 includes a photoelectric conversion element that outputs a signal corresponding to incident light. In the example illustrated in FIG. 10, the first pixel circuit region 22*a* includes sixteen pixel units 103 arranged in four rows from the second row to the fifth row and four columns from the second column to the fifth column. Similarly to FIG. 1, in FIG. 10, reference numerals indicating row numbers and column numbers are illustrated in boxes indicating the pixel units 103. The number of rows and the number of columns of the pixel units 103 included in the first pixel circuit region 22*a* are not particularly limited.

The second pixel circuit region 22*b* includes a plurality of signal generation units 104 arranged in one row and one column along the first pixel circuit region 22*a*. In the example illustrated in FIG. 10, the second pixel circuit region 22*b* includes eleven signal generation units 104 arranged in each column of the first row and each row of the first column. Similarly to FIG. 1, in FIG. 10, reference numerals indicating row numbers and column numbers are illustrated in boxes indicating the signal generation unit 104. The arrangement of the number of rows, the number of columns, and the like of the second pixel circuit region 22*b* is not limited to those illustrated in the drawings.

The third pixel circuit region 22*c* is arranged along the second pixel circuit region 22*b* on the side opposite to the first pixel circuit region 22*a*. In other words, the second pixel circuit region 22*b* is arranged between the first pixel circuit region 22*a* and the third pixel circuit region 22*c*. Like the pixel unit 103 of the first pixel circuit region 22*a*, the pixel unit 103 of the third pixel circuit region 22*c* includes a photoelectric conversion element that outputs a signal corresponding to incident light. In the example illustrated in FIG. 10, the third pixel circuit region 22*c* includes nine pixel units 103 arranged in the zeroth column and the second to fifth columns of the zeroth row, and in the second to fifth rows of the zeroth column.

The second pixel circuit region 22*b* and the third pixel circuit region 22*c* are optically shielded by a light shielding layer or the like. Thus, since light is not incident on the pixel units 103 (third signal generation unit) in the third pixel circuit region 22*c*, these pixel units 103 can output black level reference signals (fourth digital signals). Noise can be reduced by correcting the black level by, for example, subtracting the signal output from the pixel unit 103 in the third pixel circuit region 22*c* from the signal output from the pixel unit 103 in the first pixel circuit region 22*a*.

In the present embodiment, the second pixel circuit region 22*b* that is light-shielded is arranged between the first pixel circuit region 22*a* capable of detecting incident light and the third pixel circuit region 22*c* capable of outputting a black level reference signal. The second pixel circuit region 22*b* has a function of outputting a digital signal including information other than information based on incident light. Further, the second pixel circuit region 22*b* has a function of a dummy pixel that reduces an influence such as a decrease in accuracy of a reference signal due to diffraction of light incident on the first pixel circuit region 22*a* and incident on the third pixel circuit region 22*c*. Therefore, according to the present embodiment, the semiconductor device 100 capable of correcting the black level with high accuracy is provided.

Sixth Embodiment

The present embodiment is a configuration example of a semiconductor device 100 including a plurality of stacked chips. In this embodiment, description of elements common to those in the first embodiment will be omitted.

Figure 11:
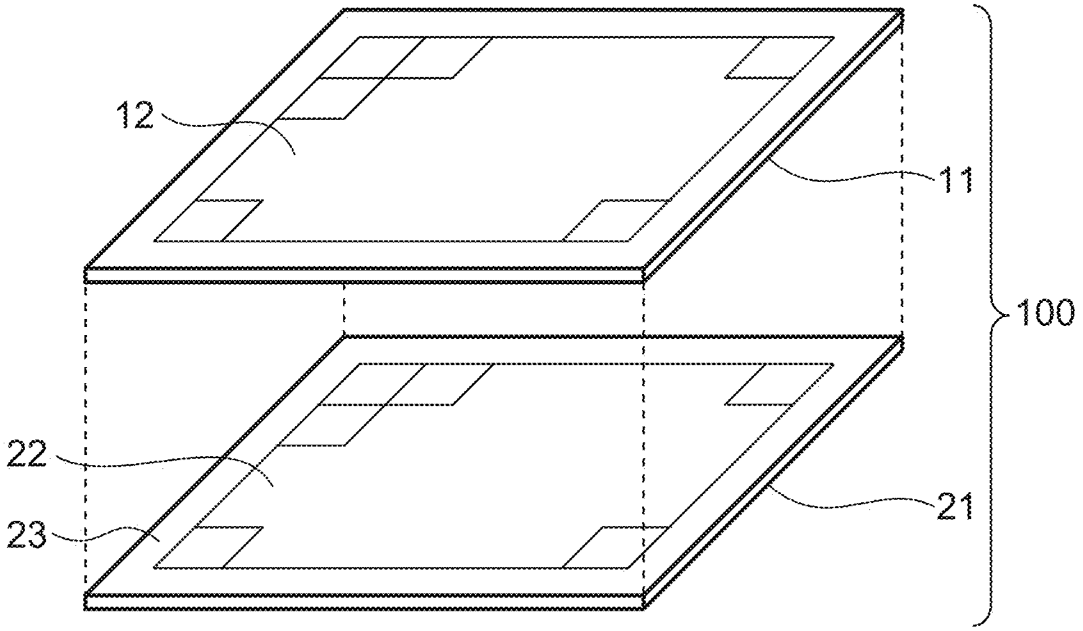
FIG. 11 is a configuration diagram of a semiconductor device according to a sixth embodiment.

FIG. 11 is an example of a configuration diagram of the semiconductor device 100 according to the present embodiment. FIG. 11 is an exploded perspective view illustrating a schematic configuration of the semiconductor device 100. The semiconductor device 100 includes a sensor chip 11 and a circuit chip 21 that are stacked. The sensor chip 11 and the circuit chip 21 are electrically connected to each other. The sensor chip 11 includes a pixel region 12. The circuit chip 21 includes a pixel circuit region 22 and a readout circuit region 23. The readout circuit region 23 is arranged outside the pixel circuit region 22 in the circuit chip 21.

Figure 12:
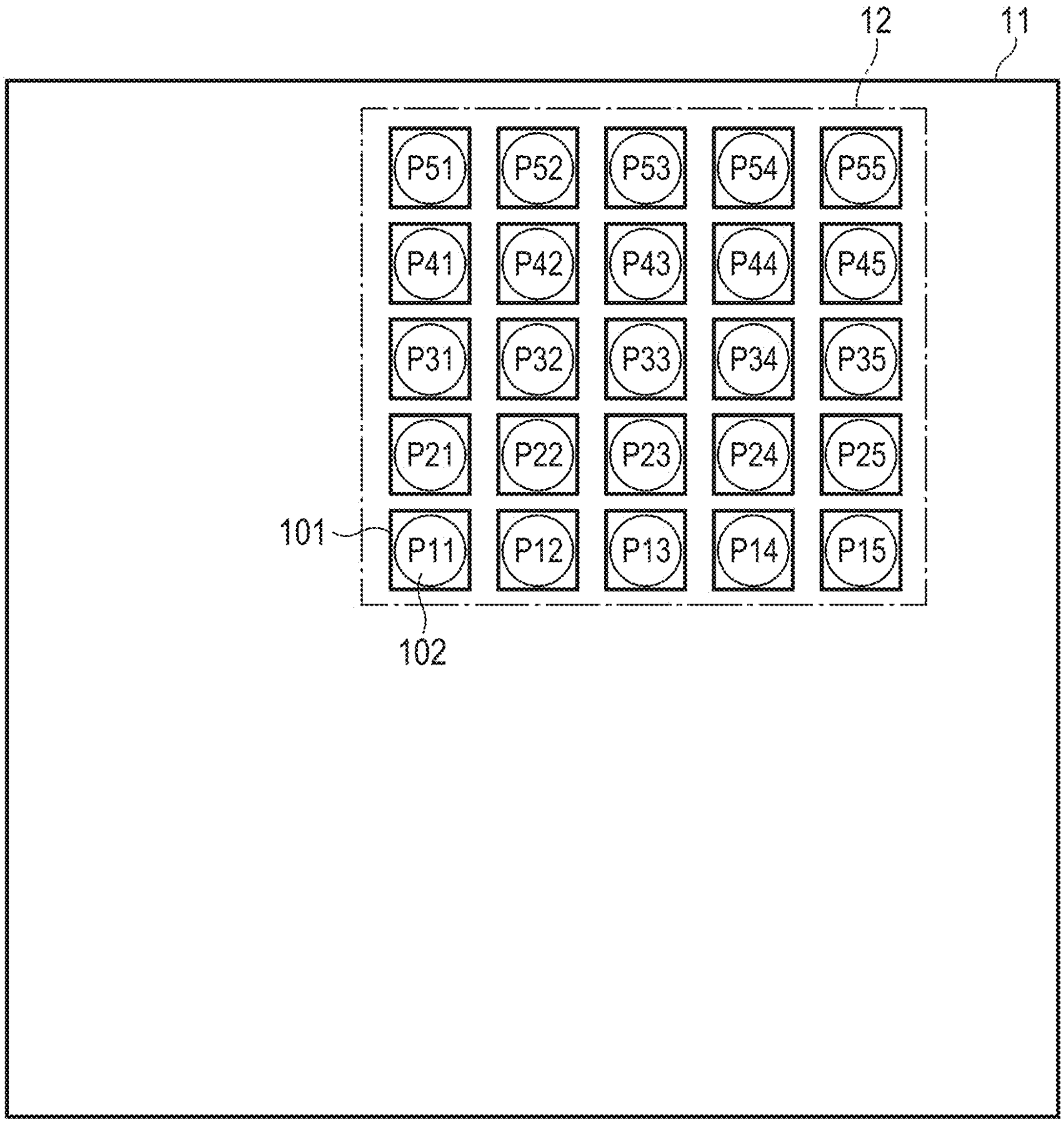
FIG. 12 is an example of a block diagram of a sensor chip according to the sixth embodiment.

FIG. 12 is an example of a block diagram of the sensor chip 11 according to the present embodiment. The pixel region 12 of the sensor chip 11 includes a plurality of pixels 101 two-dimensionally arranged over a plurality of rows and a plurality of columns. Each of the plurality of pixels 101 includes a photoelectric conversion unit 102 including an APD. In the example illustrated in FIG. 12, the pixel region 12 includes 25 pixels 101 arranged in five rows from the first row to the fifth row and five columns from the first column to the fifth column. In FIG. 12, reference numerals indicating row numbers and column numbers are illustrated in boxes indicating the pixels 101. For example, the pixel 101 arranged in the first row and the fourth column is denoted by "P14". The number of rows and columns of the pixels 101 included in the pixel region 12 is not particularly limited.

Figure 13:
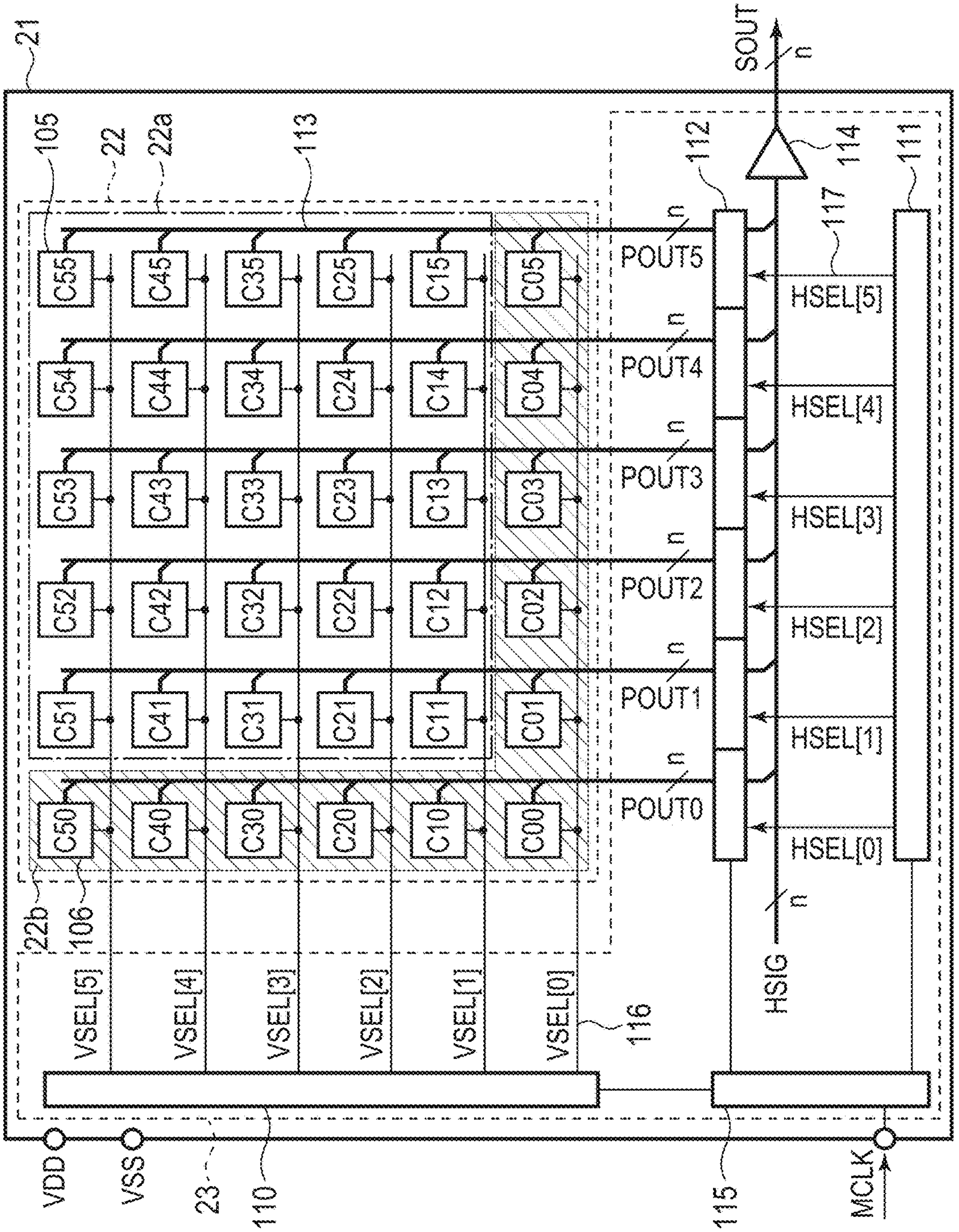
FIG. 13 is an example of a block diagram of a circuit chip according to the sixth embodiment.

FIG. 13 is an example of a block diagram of the circuit chip 21 according to the present embodiment. The circuit chip 21 includes a first pixel circuit region 22*a*, a second pixel circuit region 22*b*, and a readout circuit region 23. Note that the configuration of the readout circuit region 23 is the same as that of the first embodiment, and therefore description thereof will be omitted.

The first pixel circuit region 22*a* includes a plurality of pixel units 105 arranged two-dimensionally over a plurality of rows and a plurality of columns. In the example illustrated in FIG. 13, the first pixel circuit region 22*a* includes 25 pixel units 105 arranged in five rows from the first row to the fifth row and five columns from the first column to the fifth column. In FIG. 13, reference numerals indicating row numbers and column numbers are illustrated in boxes indicating the pixel units 105. For example, the pixel unit 105 arranged in the first row and the fourth column is denoted by "C14". The number of rows and the number of columns of the pixel units 105 included in the first pixel circuit region 22*a* are not particularly limited.

The second pixel circuit region 22*b* includes a plurality of signal generation units 106 arranged in one row and one column along the first pixel circuit region 22*a*. In the example illustrated in FIG. 13, the second pixel circuit region 22*b* includes eleven signal generation units 106 arranged in each column of the zeroth row and each row of the zeroth column. In FIG. 13, reference numerals indicating a column number and a row number are illustrated in boxes indicating the signal generation units 106. The signal generation units 106 arranged in the zeroth column to the fifth column of the zeroth row are denoted by "C00" to "C05". The signal generation units 106 arranged in the first rows to fifth rows of the zeroth column are denoted by "C10" to "C50". The arrangement of the number of rows, the number of columns, and the like of the second pixel circuit region 22*b* is not limited to those illustrated in the drawings.

Figure 14:
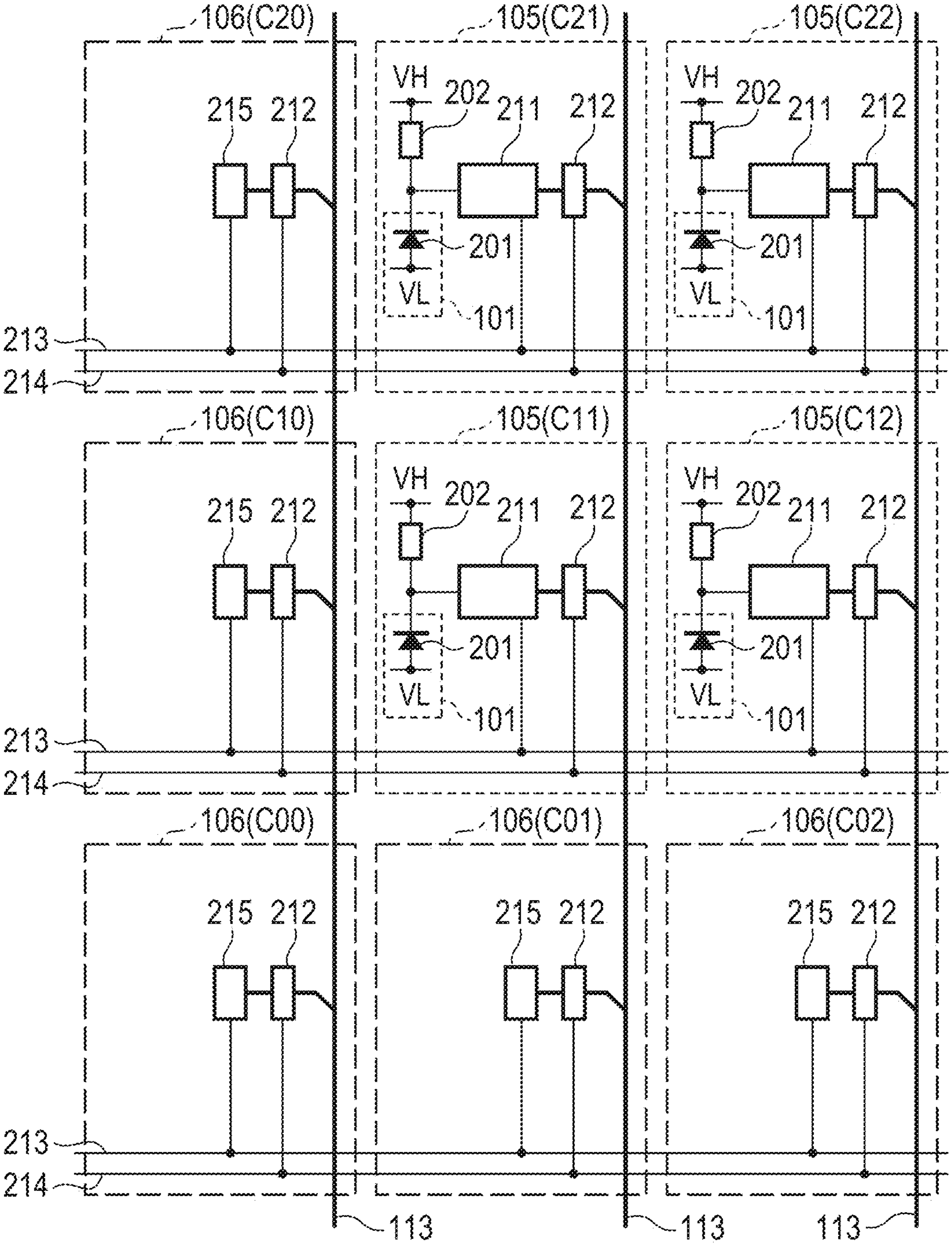
FIG. 14 is an example of an equivalent circuit diagram of a pixel region according to the sixth embodiment.

FIG. 14 is an example of an equivalent circuit diagram of the pixel region 12 according to the present embodiment. For simplicity, FIG. 14 illustrates four pixel units 105 and five signal generation units 106 arranged in the zeroth row to the second row and in the zeroth column to the second column.

As illustrated in FIG. 14, each of the plurality of pixel units 105 is electrically connected to the pixel 101. More specifically, the connection node between the quench element 202 of each of the plurality of pixel units 105 and the signal processing circuit 211 is electrically connected to the cathode of the APD 201 of the pixel 101. Other circuit configurations are the same as those in the first embodiment, and therefore, description thereof will be omitted.

As in the first embodiment, the semiconductor device 100 of the present embodiment operates in a normal mode in which pixel signals corresponding to the outputs from the plurality of pixel units 105 are output, and an inspection mode in which inspection signals corresponding to the outputs from the plurality of signal generation units 106 are output.

Although the circuit configuration of FIG. 14 is the same as that of FIG. 2 of the first embodiment, a signal line 216 may be provided as in FIG. 7 of the third embodiment, and the signal generation circuit 215 may have a function of counting pulses of a control signal input via the signal line 216.

Figure 15:
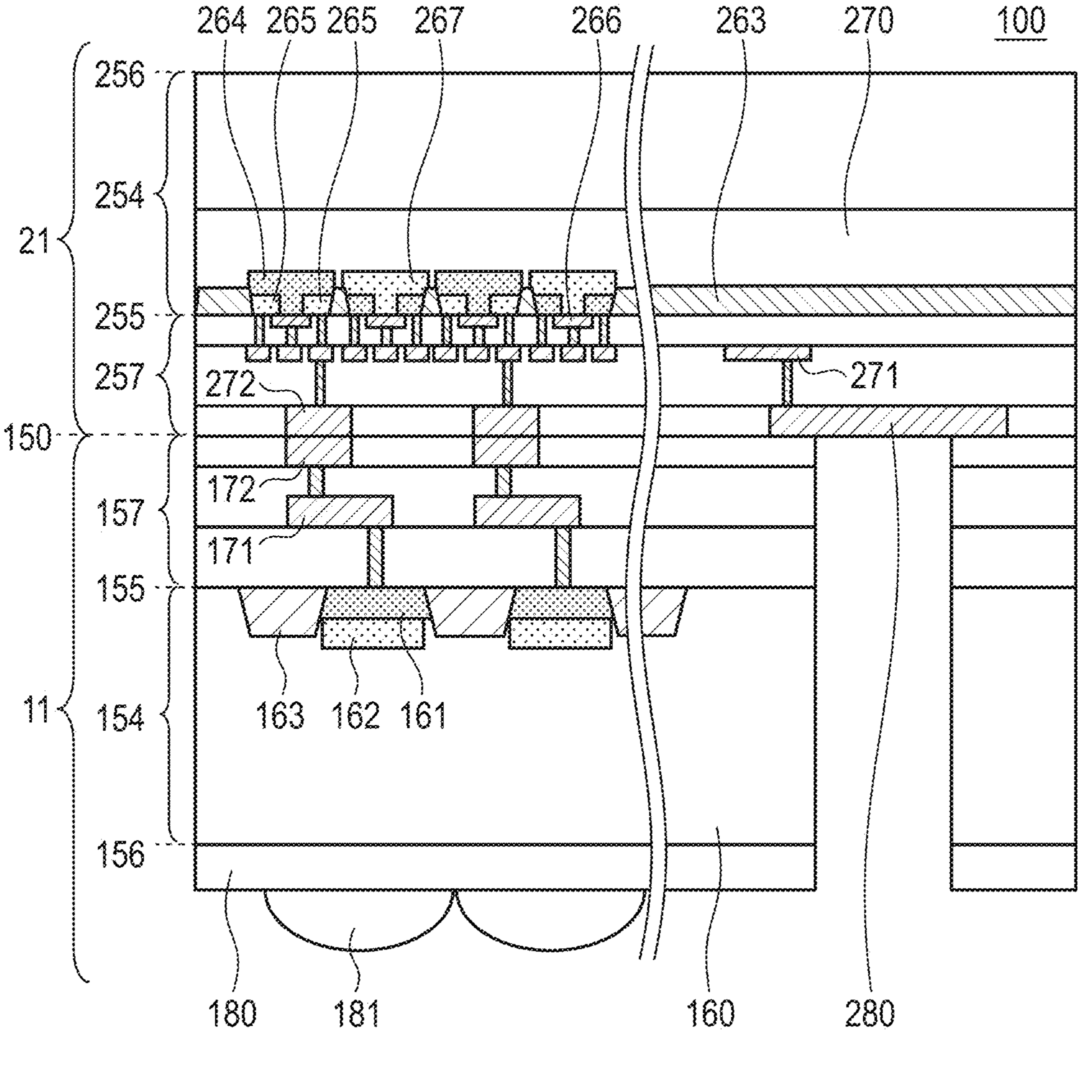
FIG. 15 is an example of a cross-sectional view of the semiconductor device according to the sixth embodiment.

FIG. 15 is an example of a cross-sectional view of a semiconductor device 100 according to the present embodiment. The semiconductor device 100 includes the sensor chip 11 and the circuit chip 21. The sensor chip 11 and the circuit chip 21 are bonded at the bonding surface 150.

The sensor chip 11 has a substrate 154 (second substrate), and the substrate 154 is, for example, a silicon substrate. In the substrate 154, a face on which a wiring layer is formed is referred to as a main face 155, and a face opposite to the main face 155 is referred to as a back face 156. A multilevel wiring structure 157 including a first wiring layer 171 and a second wiring layer 172 is provided above the main face 155 of the substrate 154 of the sensor chip 11. Here, the wiring of the first wiring layer 171 and the wiring of the second wiring layer 172 are connected by a plug formed of, for example, a conductor such as tungsten. Similarly, the gate electrode of the MOS transistor formed in the sensor chip 11 and the wiring of the first wiring layer 171 are connected by a plug, for example.

The substrate 154 is provided with, for example, a well 160 of P-type. In the well 160, an active region and an inactive region (field region) are separated by an element isolation region 163. An N-type region 161 and a P-type region 162 constituting the APD 201 are provided in the well 160. A color filter layer 180 is provided on a side of the back face 156 of the substrate 154. A microlens 181 is provided under the color filter layer 180 corresponding to the APD 201.

The circuit chip 21 has a substrate 254 (first substrate). The substrate 254 is also, for example, a silicon substrate. The substrate 254 has a main face 255 and a back face 256. A multilevel wiring structure 257 including a first wiring layer 271 and a second wiring layer 272 is provided above the main face 255 of the substrate 254 of the circuit chip 21. Here, the wiring of the first wiring layer 271 and the wiring of the second wiring layer 272 are connected by a plug formed of, for example, a conductor such as tungsten. Similarly, the gate electrode of the MOS transistor formed in the circuit chip 21 and the wiring of the first wiring layer 271 are connected by a plug, for example.

The element isolation region 263 disposed on a side of the main face 255 of the substrate 254 separates an active region and an inactive region. A well 270 is formed in the substrate 254. A plurality of transistors including a gate electrode 266, a source/drain region 265, an N-type well region 264, and a P-type well region 267 are formed in the well 270. That is, a plurality of PMOS transistors each having an N-type well region 264 and a plurality of NMOS transistors each having a P-type well region 267 are formed on the substrate 254.

The wiring of the second wiring layer 172 which is the uppermost layer of the multilevel wiring structure 157 and the wiring of the second wiring layer 272 which is the uppermost layer of the multilevel wiring structure 257 are in contact with each other at the bonding surface 150. This ensures electrical connection between the wirings.

A part of the second wiring layer 272 constitutes a terminal electrode 280. The terminal electrode 280 is an electrical connection portion for driving the semiconductor device 100 and extracting a signal. The terminal electrode 280 is electrically connected to the circuit in the sensor chip 11 and the circuit chip 21 via the wiring of the first wiring layer 271.

In the semiconductor device 100 of the present embodiment, the pixel circuit region 22 including the signal generation unit 104 and the readout circuit region 23 are arranged in the circuit chip 21. In the inspection mode, the circuit chip 21 of the semiconductor device 100 outputs a signal including inspection signals corresponding to the outputs from the plurality of signal generation units 104 arranged along the first pixel circuit region 22*a*. The semiconductor device 100 includes the terminal electrode 280 on the circuit chip 21. That is, in the inspection mode, the function of the elements provided in the sensor chip 11 is not required. Therefore, according to the present embodiment, the semiconductor device 100 capable of inspecting the circuit chip 21 before being bonded to the sensor chip 11 is provided.

In FIG. 15, in the sensor chip 11, a through hole is provided in a portion corresponding to the terminal electrode 280 of the circuit chip 21 at the time of bonding. Thus, according to the present embodiment, the semiconductor device 100 capable of inspecting the circuit chip 21 after being bonded to the sensor chip 11 is provided.

Seventh Embodiment

Figure 16:
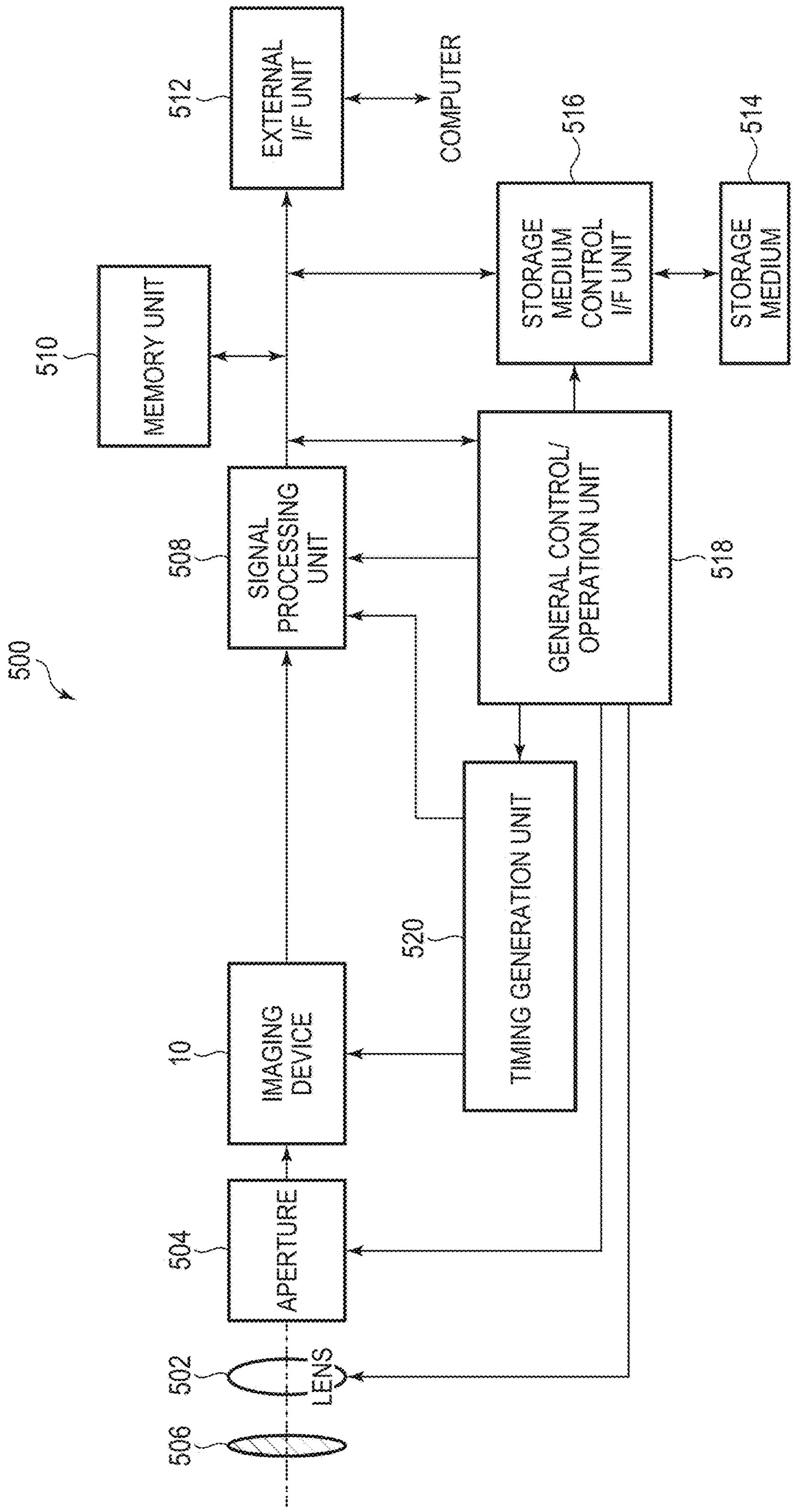
FIG. 16 is a block diagram illustrating a configuration example of an imaging system according to a seventh embodiment.

An imaging system according to a seventh embodiment of the present disclosure will be described with reference to FIG. 16. FIG. 16 is a block diagram illustrating a schematic configuration of an imaging system 500 according to the present embodiment. An imaging device 10 illustrated in FIG. 16 is a photoelectric conversion device including the semiconductor device 100 described in the first to sixth embodiments. That is, the imaging system 500 according to the present embodiment is an example of a photoelectric conversion system to which the photoelectric conversion device including the semiconductor device 100 described in the first to sixth embodiments can be applied.

The imaging system 500 according to the present embodiment is not particularly limited, but can be applied to, for example, a digital still camera, a digital camcorder, a camera head, a copier, a fax machine, a cellular phone, an in-vehicle camera, and an observation satellite.

As illustrated in FIG. 16, the imaging system 500 includes an imaging device 10, a lens 502, an aperture 504, a barrier 506, a signal processing unit 508, a timing generation unit 520, and a general control/operation unit 518. The imaging system 500 also includes a memory unit 510, a storage medium control I/F unit 516, and an external I/F unit 512.

The lens 502 forms an optical image of an object on an imaging area of the imaging device 10. The aperture 504 is for varying the amount of light passing through the lens 502. The barrier 506 is for protecting the lens 502. The imaging device 10 outputs a signal based on the optical image formed by the lens 502 to the signal processing unit 508.

The signal processing unit 508 performs desired processing, correction, data compression, and the like on a signal output from the imaging device 10. The processing performed by the signal processing unit 508 includes generation of image data, processing of acquiring distance information to an object, and the like. The signal processing unit 508 may be mounted on a substrate constituting the imaging device 10, or may be mounted on another substrate. Alternatively, some functions of the signal processing unit 508 may be mounted on a substrate constituting the imaging device 10, and other functions of the signal processing unit 508 may be mounted on another substrate.

The timing generation unit 520 outputs various timing signals to the imaging device 10 and the signal processing unit 508. The general control/operation unit 518 is a control unit that controls overall driving and arithmetic processing of the imaging system 500. Here, a control signal such as a timing signal may be input from the outside of the imaging system 500, and the imaging system 500 may include at least the imaging device 10 and the signal processing unit 508 that processes a signal output from the imaging device 10.

The memory unit 510 is a frame memory unit for temporarily storing image data. The storage medium control I/F unit 516 is an interface unit for performing storing on the storage medium 514 and reading from the storage medium 514. The external I/F unit 512 is an interface unit for communicating with an external computer or the like. The storage medium 514 is a removable storage medium such as a semiconductor memory for storing or reading image data.

In this manner, the imaging system 500 to which the semiconductor device 100 according to the first to sixth embodiments is applied is provided.

Eighth Embodiment

Figure 17A:
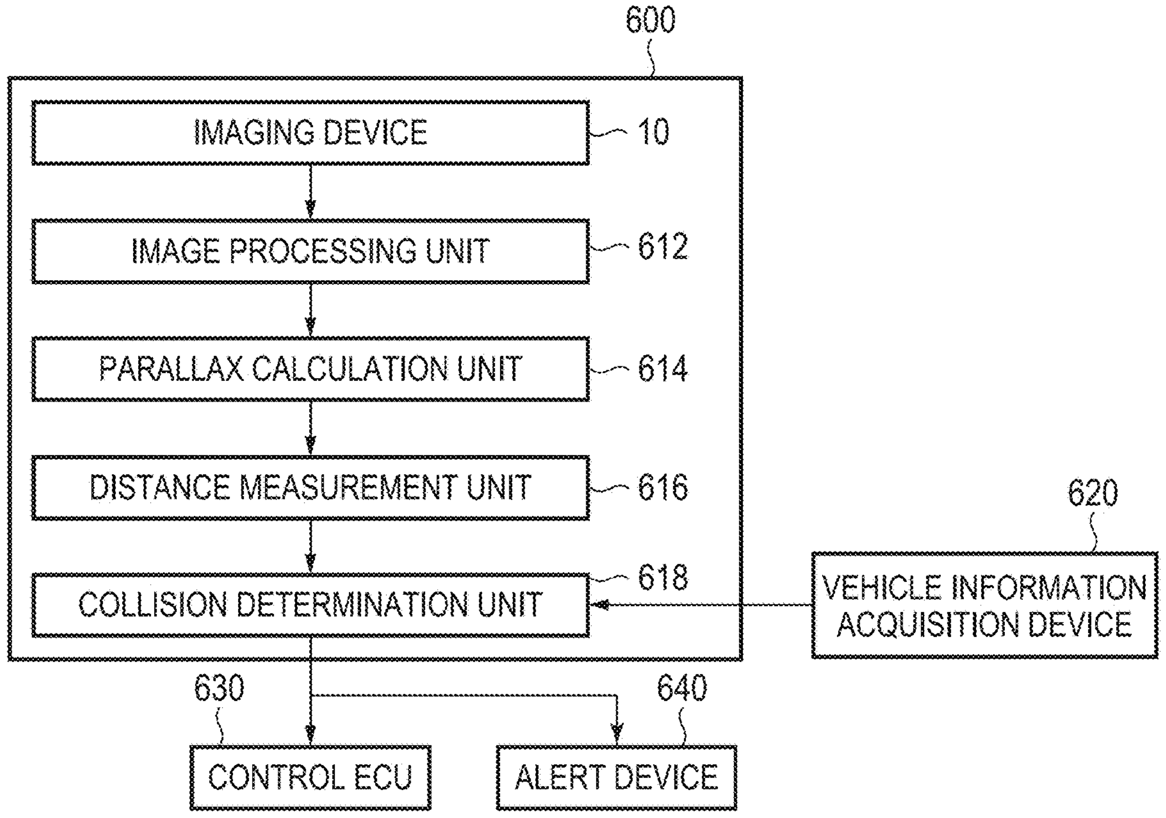
FIGS. 17A and 17B are diagrams illustrating a configuration example of an imaging system and a movable body according to an eighth embodiment.
Figure 17B:
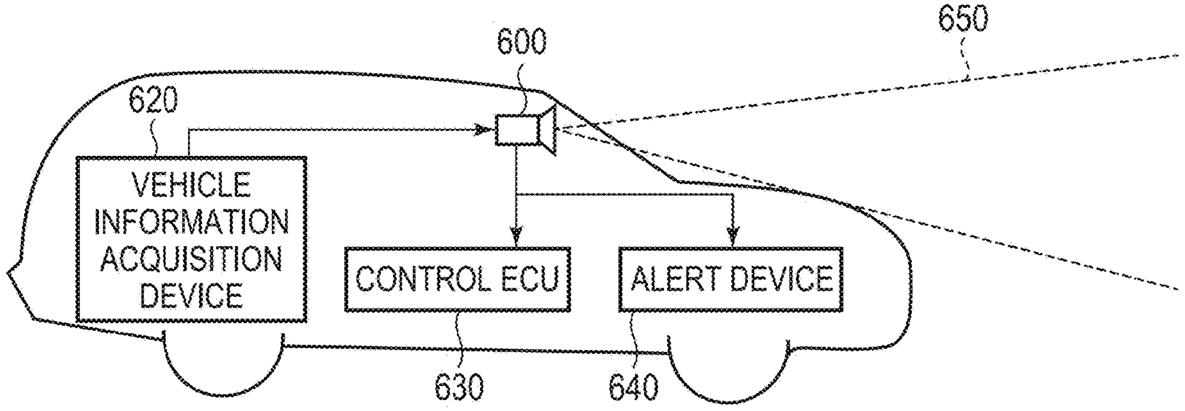

FIGS. 17A and 17B are diagrams illustrating configurations of an imaging system 600 and a movable body according to the present embodiment. FIG. 17A illustrates an example of an imaging system 600 related to an in-vehicle camera. An imaging system 600 includes an imaging device 10 which is an example of a photoelectric conversion device including the semiconductor device 100 according to any one of the first to sixth embodiments. The imaging system 600 includes an image processing unit 612 that performs image processing on a plurality of image data acquired by the imaging device 10, and a parallax calculation unit 614 that calculates parallax (phase difference of parallax images) from the plurality of image data acquired by the imaging system 600. Further, the imaging system 600 includes a distance measurement unit 616 that calculates a distance to the object based on the calculated parallax, and a collision determination unit 618 that determines whether there is a possibility of collision based on the calculated distance. Here, the parallax calculation unit 614 and the distance measurement unit 616 are an example of a distance information acquiring means that acquires distance information to an object. That is, the distance information is information related to parallax, defocus amount, distance to an object, and the like. The collision determination unit 618 may determine the possibility of collision using any of the distance information. The distance information acquisition means may be realized by hardware designed dedicatedly, or may be realized by a software module. It may be realized by a field programmable gate array (FPGA), an application specific integrated circuit (ASIC) or the like, or may be realized by a combination of these.

The imaging system 600 is connected to the vehicle information acquisition device 620, and can acquire vehicle information such as a vehicle speed, a yaw rate, and a steering angle. Further, the imaging system 600 is connected to a control ECU 630, which is a control device that outputs a control signal for generating braking force to the vehicle based on the determination result of the collision determination unit 618. That is, the control ECU 630 is an example of movable body control means for controlling the movable body based on the distance information. The imaging system 600 is also connected to an alert device 640 that issues an alarm to the driver based on the determination result of the collision determination unit 618. For example, when the possibility of collision is high as the determination result of the collision determination unit 618, the control ECU 630 performs vehicle control for avoiding collision and reducing damage by applying a brake, returning an accelerator, suppressing engine output, or the like. The alert device 640 sounds an alarm such as a sound, displays alarm information on a screen of a car navigation system or the like, applies vibration to a seatbelt or a steering wheel, or the like, to issue an alert to the user.

In this embodiment, the imaging system 600 captures an image of the periphery of the vehicle, for example, the front or the rear of the vehicle. FIG. 17B illustrates a configuration of the imaging system 600 when capturing an image of the front of the vehicle (imaging range 650). The vehicle information acquisition device 620 sends an instruction to operate the imaging system 600 to execute imaging.

In this manner, the imaging system 600 and the movable body to which the semiconductor device 100 according to the first to sixth embodiments is applied are provided.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable body (movable apparatus) such as a ship, an airplane, an industrial robot, for example. In addition, the imaging system can be widely applied to a device which utilizes object recognition such as an intelligent transportation system (ITS) or the like, without being limited to movable body.

Modified Embodiments

The present invention is not limited to the above-described embodiments, and various modifications are possible. For example, it is to be understood that an embodiment in which a part of the configuration of any of the embodiments is added to another embodiment or an embodiment in which a part of the configuration of any of the embodiments is replaced with a part of the configuration of any of another embodiment is also an embodiment to which the present invention can be applied.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-177921, filed Oct. 23, 2020, which is hereby incorporated by reference herein in its entirety.

What is claimed is:

1. A semiconductor device comprising:

a plurality of first signal generation units arranged so as to form a plurality of rows and a plurality of columns and corresponding to a plurality of pixels configured to output a signal in response to incidence of light, each of the plurality of first signal generation units being configured to output a first digital signal in response to an output from a corresponding pixel;

a plurality of second signal generation units arranged corresponding to at least a part of the plurality of rows and the plurality of columns, each of the plurality of second signal generation units being configured to output a second digital signal having a predetermined digital value;

a plurality of third signal generation units arranged corresponding to a plurality of light-shielded pixels, each of the plurality of third signal generation units being configured to output a fourth digital signal in response to an output from a corresponding light-shielded pixel; and a readout circuit configured to output a signal based on at least one of the first digital signal and the second digital signal that is output from a selected part of the plurality of first signal generation units and the plurality of second signal generation units, wherein at least one of the plurality of second signal generation units is provided between at least one of the plurality of first signal generation units and an end of a chip provided with the plurality of first signal generation units, and wherein the at least one of the plurality of second signal generation units is provided between at least one of the plurality of first signal generation units and at least one of the plurality of third signal generation units.

2. The semiconductor device according to claim 1, wherein the plurality of second signal generation units are arranged to correspond to the plurality of rows.

3. The semiconductor device according to claim 1, wherein the plurality of second signal generation units are arranged to correspond to the plurality of columns.

4. The semiconductor device according to claim 1, wherein the second digital signal has a plurality of bits, and of the plurality of bits, all even-numbered bits are at a high level and all odd-numbered bits are at a low level, or all even-numbered bits are at a low level and all odd-numbered bits are at a high level.

5. The semiconductor device according to claim 1, wherein the readout circuit outputs a third digital signal obtained by combining the first digital signal and the second digital signal.

6. The semiconductor device according to claim 5, wherein the third digital signal includes information indicating an address of a first signal generation unit that outputs the first digital signal.

7. The semiconductor device according to claim 1 further comprising a first substrate, wherein the plurality of first signal generation units, the plurality of second signal generation units, the third signal generation units, and the readout circuit are arranged in the first substrate.

8. The semiconductor device according to claim 7, wherein a terminal electrode for outputting a signal from the readout circuit to an outside is arranged in the first substrate.

9. The semiconductor device according to claim 7 further comprising a second substrate, wherein the plurality of pixels are arranged in the second substrate.

10. The semiconductor device according to claim 9, wherein the first substrate and the second substrate are stacked on each other, and wherein each of the plurality of pixels is electrically connected to corresponding one of the plurality of first signal generation units.

11. The semiconductor device according to claim 1, wherein each of the plurality of pixels includes an avalanche photodiode.

12. The semiconductor device according to claim 11, wherein each of the plurality of first signal generation units includes a counter circuit configured to count a change in potential of the avalanche photodiode.

13. A photoelectric conversion system comprising:

a photoelectric conversion device including the semiconductor device according to claim 1; and a signal processing circuit configured to process a signal output from the photoelectric conversion device.

14. A movable body comprising:

a photoelectric conversion device including the semiconductor device according to claim 1;

a distance information acquisition circuit configured to acquire distance information on a distance to an object, from a parallax image based on signals from the photoelectric conversion device; and a control circuit configured to control the movable body based on the distance information.

15. A semiconductor device comprising:

a plurality of first signal generation units arranged so as to form a plurality of rows and a plurality of columns and corresponding to a plurality of pixels configured to output a signal in response to incidence of light, each of the plurality of first signal generation units being configured to output a first digital signal in response to an output from a corresponding pixel;

a plurality of second signal generation units arranged corresponding to at least a part of the plurality of rows and the plurality of columns, each of the plurality of second signal generation units being configured to output a second digital signal having a predetermined digital value; and a readout circuit configured to output a signal based on at least one of the first digital signal and the second digital signal that is output from a selected part of the plurality of first signal generation units and the plurality of second signal generation units, wherein at least one of the plurality of second signal generation units is provided between the plurality of first signal generation units and an end of a chip provided with the plurality of first signal generation units, wherein the second digital signal has a plurality of bits, and wherein all of the plurality of bits are at the same level.

16. A semiconductor device comprising:

a plurality of first signal generation units arranged so as to form a plurality of rows and a plurality of columns and corresponding to a plurality of pixels configured to output a signal in response to incidence of light, each of the plurality of first signal generation units being configured to output a first digital signal in response to an output from a corresponding pixel;

a plurality of second signal generation units arranged corresponding to at least a part of the plurality of rows and the plurality of columns, each of the plurality of second signal generation units being configured to output a second digital signal having a predetermined digital value; and a readout circuit configured to output a signal based on at least one of the first digital signal and the second digital signal that is output from a selected part of the plurality of first signal generation units and the plurality of second signal generation units, wherein at least one of the plurality of second signal generation units is provided between the plurality of first signal generation units and an end of a chip provided with the plurality of first signal generation units, and wherein each of the plurality of second signal generation units generates the second digital signal based on a count number of pulses included in a control signal that is input.

17. The semiconductor device according to claim 16, wherein the readout circuit does not output the second digital signal in a first mode, but outputs the second digital signal in a second mode.

18. The semiconductor device according to claim 17, wherein the readout circuit outputs the first digital signal in both the first mode and the second mode.

19. The semiconductor device according to claim 17, wherein the readout circuit outputs the first digital signal in the first mode, and does not output the first digital signal in the second mode.

20. The semiconductor device according to claim 17, wherein the second mode is an inspection mode for inspecting the readout circuit.

21. The semiconductor device according to claim 20, wherein the plurality of first signal generation units, the plurality of second signal generation units, the plurality of third signal generation units, and the readout circuit are arranged in a first substrate, wherein the plurality of pixels are arranged in a second substrate, and wherein an inspection of the readout circuit is performed in the second mode before stacking the second substrate and the first substrate.

* * * * *